(12) United States Patent
Aruga et al.

(10) Patent No.: US 11,560,987 B2
(45) Date of Patent: Jan. 24, 2023

(54) LIGHT SOURCE DEVICE

(71) Applicant: NICHIA CORPORATION, Anan (JP)

(72) Inventors: Takanori Aruga, Suwa-gun (JP); Akira Nagahashi, Okaya (JP)

(73) Assignee: NICHIA CORPORATION, Anan (JP)

( * ) Notice: Subject to any disclaimer, the term of this patent is extended or adjusted under 35 U.S.C. 154(b) by 261 days.

(21) Appl. No.: 17/099,453

(22) Filed: Nov. 16, 2020

(65) Prior Publication Data

US 2021/0148525 A1   May 20, 2021

(30) Foreign Application Priority Data

Nov. 20, 2019  (JP) .............................. JP2019-209373
Jun. 12, 2020  (JP) .............................. JP2020-102260

(51) Int. Cl.
*F21K 9/69*    (2016.01)
*F21K 9/64*    (2016.01)
*F21Y 115/30*  (2016.01)

(52) U.S. Cl.
CPC ................. *F21K 9/69* (2016.08); *F21K 9/64* (2016.08); *F21Y 2115/30* (2016.08)

(58) Field of Classification Search
CPC ................ G02B 27/09; G02B 27/0927; G02B 27/0944; G02B 27/0955
See application file for complete search history.

(56) References Cited

U.S. PATENT DOCUMENTS

| | | | | |
|---|---|---|---|---|
| 3,476,463 A | * | 11/1969 | Kreuzer | ................ H01S 3/0007 372/101 |
| 5,148,317 A | * | 9/1992 | Foresi | ................ G02B 19/0052 359/566 |
| 6,201,229 B1 | | 3/2001 | Tawa et al. | |
| 6,400,745 B1 | | 6/2002 | Ori | |
| 6,437,284 B1 | * | 8/2002 | Okamoto | ........... B23K 26/0732 219/121.73 |
| 6,531,677 B2 | * | 3/2003 | Arai | ..................... B23K 26/067 219/121.61 |
| 8,427,752 B2 | * | 4/2013 | Dohi | .................... G02B 21/086 359/385 |
| 9,285,593 B1 | * | 3/2016 | Laskin | ................. G02B 27/095 |
| 2005/0094288 A1 | | 5/2005 | Hirai et al. | |

FOREIGN PATENT DOCUMENTS

| | | |
|---|---|---|
| JP | H01-099017 A | 4/1989 |
| JP | H11-258544 A | 9/1999 |
| JP | 2001-125040 A | 5/2001 |
| JP | 2002-198568 A | 7/2002 |
| JP | 2003-001472 A | 1/2003 |
| JP | 2004-252275 A | 9/2004 |
| JP | 2005-134681 A | 5/2005 |
| JP | 2013-130835 A | 7/2013 |

* cited by examiner

*Primary Examiner* — William J Carter
(74) *Attorney, Agent, or Firm* — Foley & Lardner LLP

(57) ABSTRACT

A light source device includes a light source device includes a first light source configured to emit first light, and a first lens that includes a first surface on which the first light having a first optical axis is incident and a second surface from which a second light having a second optical axis is emitted. An intensity of the first light has a first value on the first optical axis of the first light.

20 Claims, 25 Drawing Sheets

LIGHT SOURCE DEVICE

CROSS-REFERENCE TO RELATED APPLICATIONS

This application claims priority to Japanese Patent Application No. 2019-209373, filed on Nov. 20, 2019, and Japanese Application No. 2020-102260, filed on Jun. 12, 2020. The contents of these applications are hereby incorporated by reference in their entireties.

BACKGROUND

1. Technical Field

The present disclosure relates to a light source device.

2. Description of Related Art

There are light source devices using, for example, laser diodes or the like. Such light source devices are desired to exhibit light intensity distribution of improved uniformity (for example, see JP 2004-252275 A).

SUMMARY

Certain embodiments of the present invention allows for providing a light source device in which uniformity of light intensity distribution can be improved.

According to one embodiment of the present invention, a light source device includes a first light source configured to emit first light; and a first lens that includes a first surface on which the first light having a first optical axis is incident and a second surface from which second light having a second optical axis is emitted. An intensity of the first light in a direction of the first optical axis has a first value. The intensity of the first light in a direction at a first angle with respect to the first optical axis is 0.7 times as great as the first value. The intensity of the first light in a direction at a second angle with respect to the first optical axis is 0.5 times as great as the first value. The intensity of the first light in a direction at a third angle with respect to the first optical axis is 0.3 times as great as the first value. An intensity of the second light in a direction of the second optical axis has a second value. The intensity of the second light in a direction at a fourth angle with respect to the second optical axis is 0.7 times as great as the second value. The intensity of the second light in a direction at a fifth angle with respect to the second optical axis is 0.5 times as great as the second value. The intensity of the second light in a direction at a sixth angle with respect to the second optical axis is 0.3 times as great as the second value. The direction at the first angle, the direction at the second angle, the direction at the fourth angle, the direction at the fifth angle, and the direction at the sixth angle extend in a first plane that includes the direction at the third angle and the first optical axis. An angle with respect to the first optical axis in the first plane, at which the intensity of the first light is 0.135 times as great as the first value, is 3 degrees or more. The first lens is configured such that: where a first ratio is a ratio of (i) an absolute value of a difference between the first angle and the third angle to (ii) the second angle, and where a second ratio is a ratio of (i) an absolute value of a difference between the fourth angle and the sixth angle to (ii) the fifth angle, the second ratio is smaller than the first ratio.

According to certain embodiments of the present invention, a light source device that exhibits light intensity distribution of improved uniformity can be provided.

DETAILED DESCRIPTION

Figure 1:
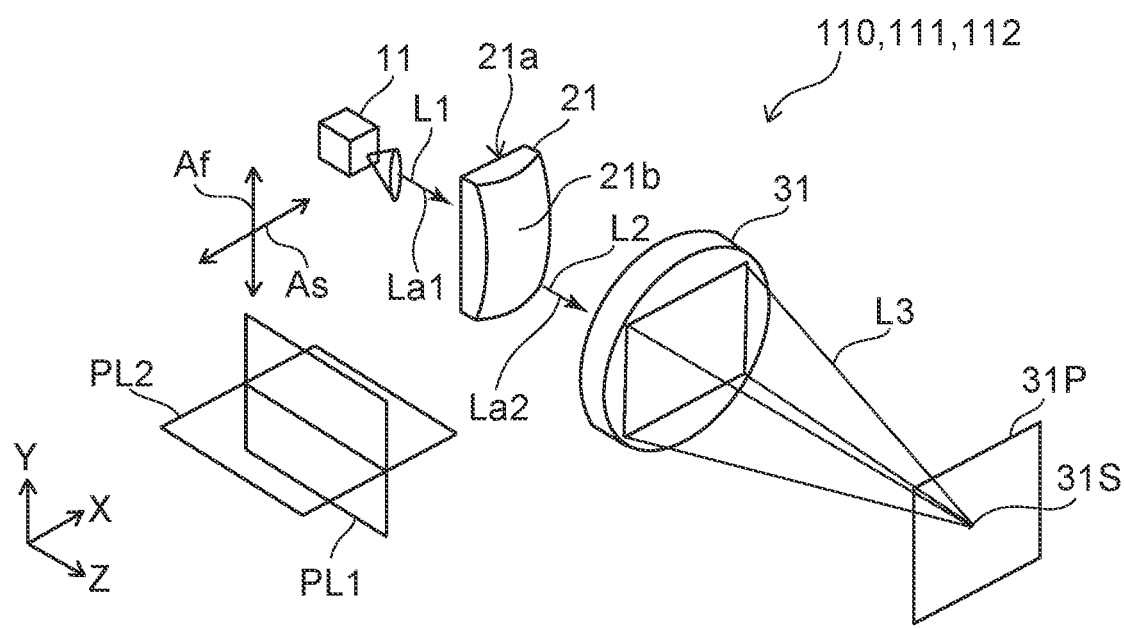
FIG. 1 is a schematic perspective view of a light source device according to a first embodiment.

Certain embodiments of the present invention will be described below with reference to the drawings.

The drawings are schematic or illustrate general ideas, and the relationship between a thickness and a width of elements, the proportion of dimension among elements and the like may not coincide with those in actual light source devices. Identical portions may appear different in relative dimension or proportion among the drawings.

In the present specification, an element similar to those already described with reference to drawings previously referred to will be denoted by an identical reference character, and a detailed description thereof will be omitted as appropriate.

First Embodiment

FIG. 1 is a schematic perspective view of a light source device according to a first embodiment.

Figure 2:
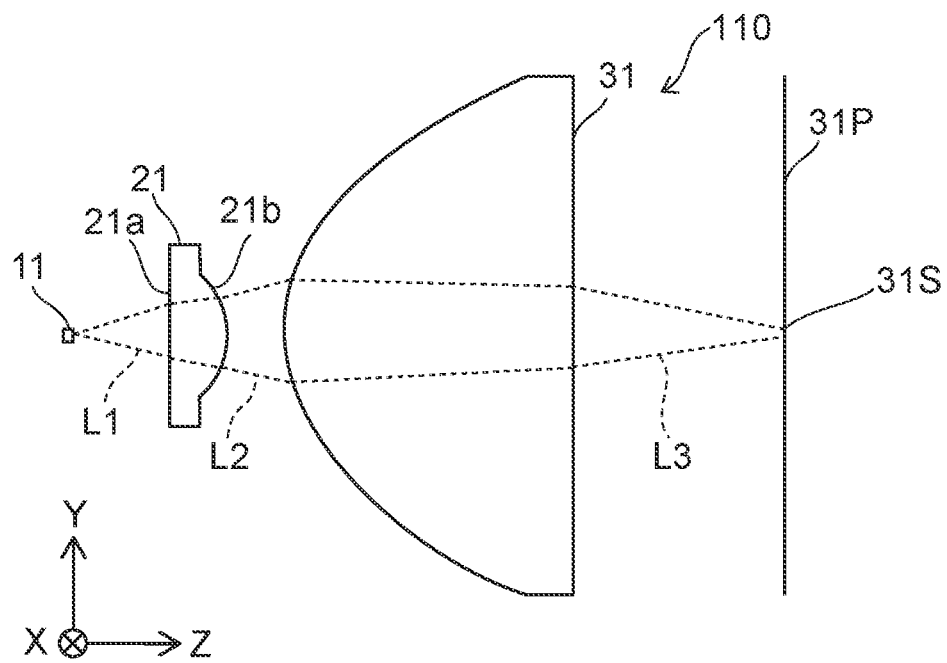
FIG. 2 is a schematic diagram of the light source device according to the first embodiment.

FIG. 2 is a schematic diagram of the light source device according to the first embodiment.

As illustrated in FIG. 1, a light source device 110 according to one embodiment includes a first light source 11 and a first lens 21. The first light source 11 emits a first light L1. The first light L1 is incident on the first lens 21. The first light source 11 includes, for example, a laser. Examples of the laser include a semiconductor laser. The first light L1 is, for example, laser light. In one example, the peak wavelength of the first light L1 is in a range of 300 nm to 800 nm.

The first lens 21 includes a first surface 21a and a second surface 21b. The first light L1 is incident on the first surface 21a. The second light L2 is emitted from the second surface 21b. The first surface 21a is the incident surface of the first lens 21. The second surface 21b is the emission surface of the first lens 21. The first light L1 incident on the first surface 21a is emitted from the second surface 21b as the second light L2.

The first lens 21 may include, for example, resin, glass, or quartz.

In the present specification, a direction from the first surface 21a of the first lens 21 toward the second surface 21b of the first lens 21 is defined as a "Z-axis direction." For example, the Z-axis direction corresponds to the propagation of the first light L1 incident on the first surface 21a.

A direction perpendicular to the Z-axis direction is defined as a "X-axis direction." A direction perpendicular to the Z-axis direction and the X-axis direction is defined as a "Y-axis direction."

For example, when the first light L1 is laser light, a fast axis Af and a slow axis As are perpendicular to the Z-axis direction. For example, the fast axis Af may extend in the Y-axis direction. For example, the slow axis As may extend in the X-axis direction.

In one embodiment, the first light L1 emitted from the first light source 11 may be directly incident on the first surface 21a. The first light L1 emitted from the first light source 11 may be incident on the first surface 21a via an optical element (for example, a reflective surface) or the like. An example in which the first light L1 emitted from the first light source 11 is directly incident on the first surface 21a will be described below.

The first light L1 incident on the first surface 21a travels along a first optical axis La1. The second light L2 emitted from the second surface 21b travels along a second optical axis La2.

As illustrated in FIG. 1, in one example, the second light L2 is incident on an optical element 31. The optical element 31 is configured to condenses the second light L2. In this example, the optical element 31 is a lens. A third light L3 emitted from the optical element 31 is condensed at a condensing position 31P. At the condensing position 31P, for example, an incident region 31S of the third light L3 is formed. The incident region 31S has, for example, a quadrangular shape. For example, a wavelength conversion member or the like may be disposed at the incident region 31S, to convert the wavelength of the third light L3. In one example, light irradiated onto the incident region 31S (the third light L3) may be used as the light obtained from the light source device 110. The light source device 110 may include the optical element 31. The light source device 110 may include the wavelength conversion member.

When the light source device 110 includes the first light source 11 and the first lens 21, the second light L2 may be used as the light obtained from the light source device 110.

As illustrated in FIG. 2, for example, the first surface 21a is a substantially flat surface and the second surface 21b is a convex surface. The first surface 21a may be a convex surface and the second surface 21b may be a substantially flat surface. The first surface 21a may be a concave surface or a convex surface. The second surface 21b may be a concave surface or a convex surface.

As illustrated in FIG. 1, a first plane PL1 and a second plane PL2 can be defined. The first plane PL1 includes the first optical axis La1 of the first light L1 and a direction that intersects the first optical axis La1. In the example in FIG. 1, the first plane PL1 includes the first optical axis La1 (for example, the Z-axis direction) and the Y-axis direction. For example, the first plane PL1 extends along the fast axis Af.

The second plane PL2 is perpendicular to the first plane PL1. The second plane PL2 includes the first optical axis La1 of the first light L1. In the example in FIG. 1, the second plane PL2 includes the first optical axis La1 (for example, the Z-axis direction) and the X-axis direction. For example, the second plane PL2 extends along the slow axis As.

An example of a characteristic of the first lens 21 will be described below. For example, the first lens 21 converts the distribution of the first light L1 incident on the first surface 21a to the distribution of the second light L2 emitted from the second surface 21b.

Figure 3:
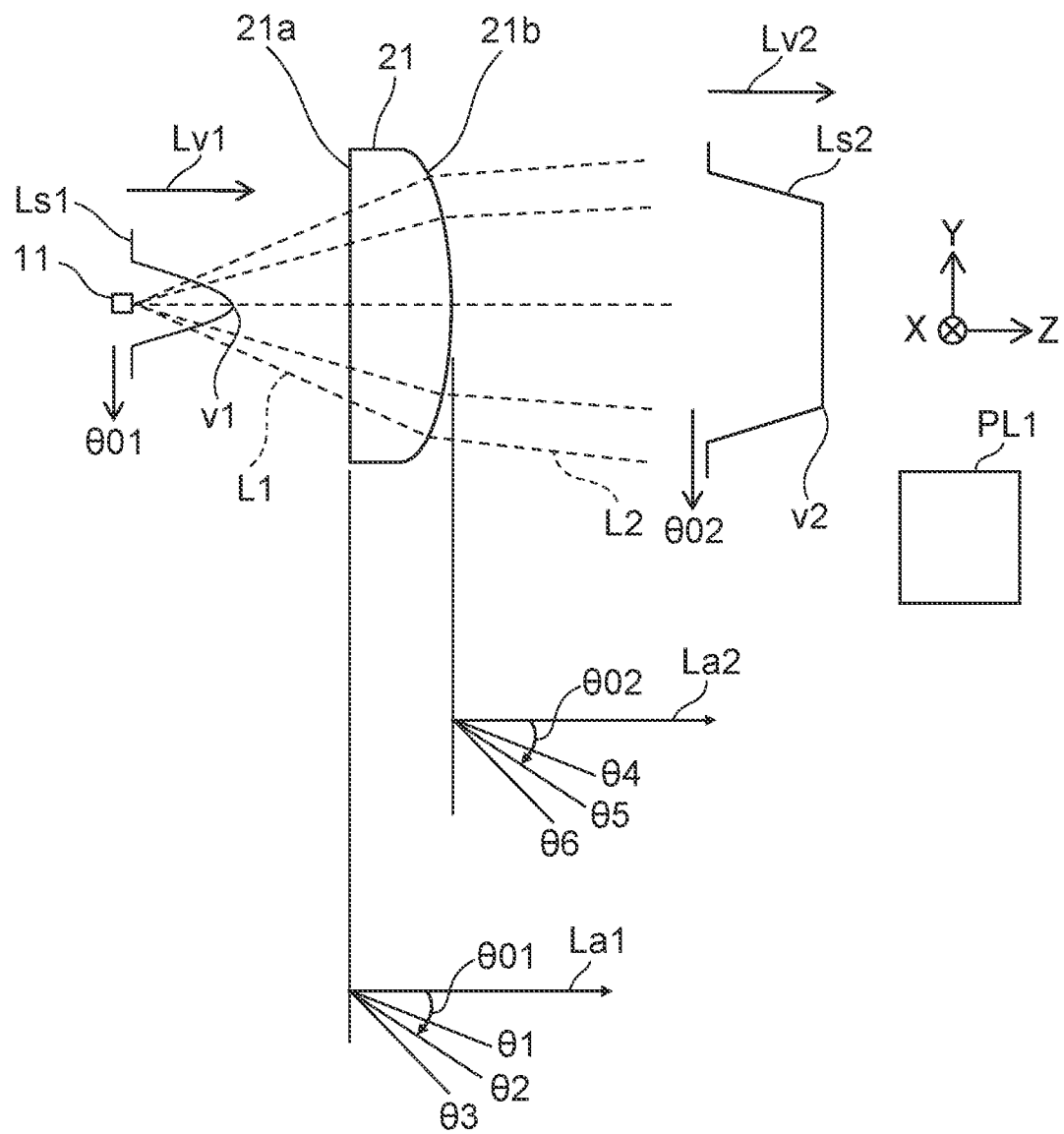
FIG. 3 is a schematic diagram of the light source device according to the first embodiment.
Figure 4:
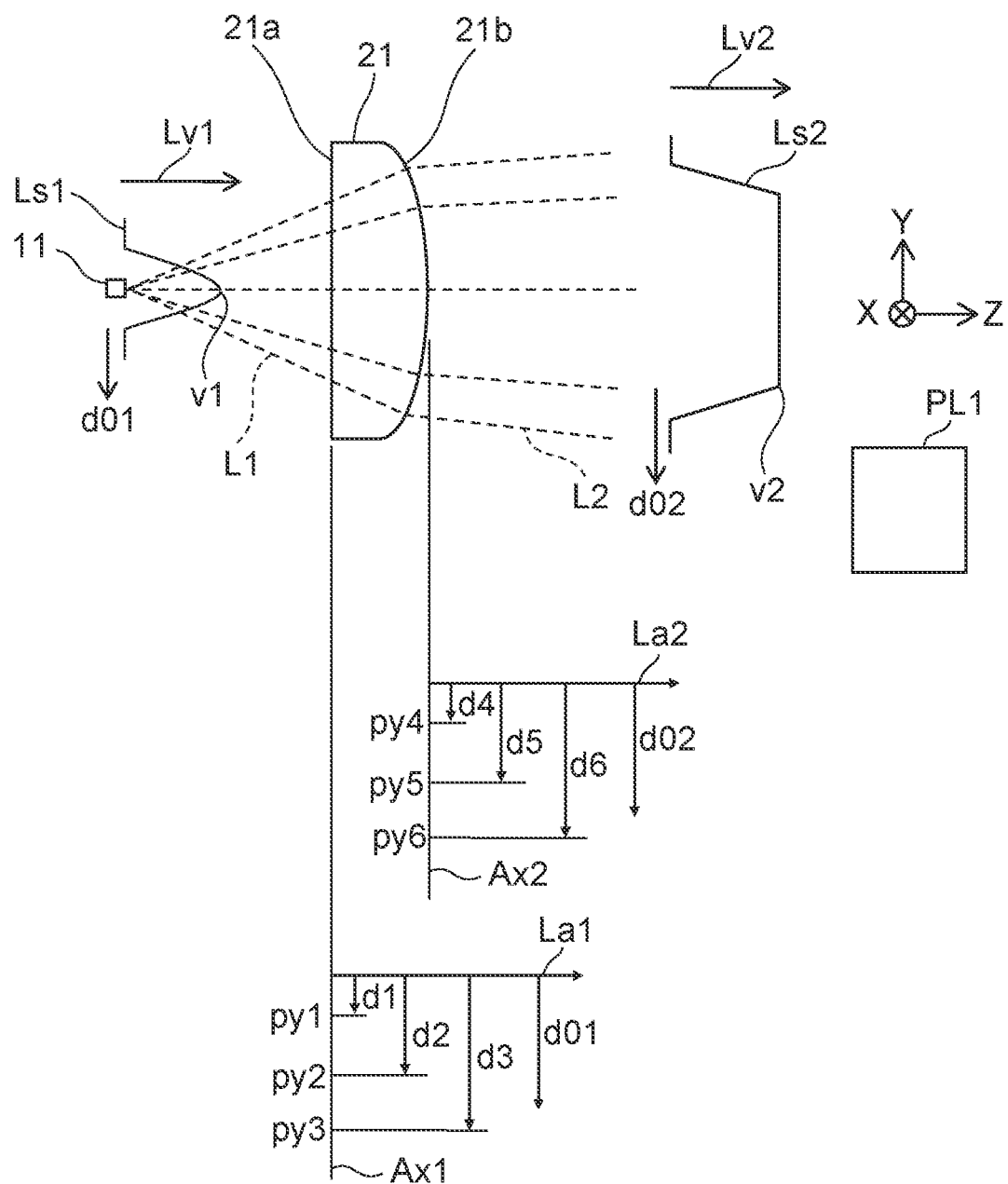
FIG. 4 is a schematic diagram of the light source device according to the first embodiment.

FIGS. 3 and 4 are schematic diagrams of the light source device according to the first embodiment.

Each of FIGS. 3 and 4 is a schematic diagram taken along the first plane PL1. The first plane PL1 extends along, for example, the Y-Z plane.

FIGS. 3 and 4 schematically illustrate the distribution of an intensity Ls1 of the first light L1. An axis Lv1 in the right-left direction in FIGS. 3 and 4 corresponds to the intensity Ls1 of the first light L1. As illustrated in FIGS. 3 and 4, the intensity Ls1 of the first light L1 has a first value v1 on the first optical axis La1 of the first light L1. The first value v1 may substantially correspond to the peak value of the intensity Ls1 of the first light L1. In the distribution of the intensity Ls1 of the first light L1, the amplitude may slightly vary. In such a case, for example, the first value v1 may correspond to the average value of the slightly varying amplitude.

FIGS. 3 and 4 schematically illustrate the distribution of intensity Ls2 of the second light L2. An axis Lv2 in the right-left direction in FIGS. 3 and 4 corresponds to the intensity Ls2 of the second light L2. As illustrated in FIGS. 3 and 4, the intensity Ls2 of the second light L2 has a second value v2 on the second optical axis La2 of the second light L2. The second value v2 may substantially correspond to the peak value of the intensity Ls2 of the second light L2. In the distribution of the intensity Ls2 of the second light L2, the amplitude may slightly vary. In such a case, for example, the second value v2 may correspond to the average value of the slightly varying amplitude.

With respect to the angular distribution of the intensity Ls1 of the first light L1, an angle θ01 as shown in FIG. 3 can be defined. The angle θ01 is defined as an angle with respect to the first optical axis La1 in the first plane PL1. The angle θ01 includes, for example, first to third angles θ1 to θ3 which will be described below.

With respect to the angular distribution of the intensity Ls2 of the second light L2, an angle θ02 as shown in FIG. 3 can be defined. The angle θ02 is defined as an angle with respect to the second optical axis La2 in the first plane PL1. The angle θ02 includes, for example, forth to sixth angles θ4 to θ6 which will be described below.

With respect to the distance distribution of the intensity Ls1 of the first light L1, a distance d01 as shown in FIG. 4 can be defined. The distance d01 is defined as a distance from the first optical axis La1 along a first axis Ax1. The first axis Ax1 extends in the first plane PL1. The first axis Ax1 intersects the first optical axis La1. For example, the first axis Ax1 is perpendicular to the first optical axis La1. The first axis Ax1 may intersect with the first optical axis La1, for example, at a position on the first surface 21a. First to third positions py1 to py3 exist on the first axis Ax1. A first distance d1 corresponds to the distance between the first optical axis La1 and the first position py1 along the first axis Ax1. A second distance d2 corresponds to the distance between the first optical axis La1 and the second position py2 along the first axis Ax1. A third distance d3 corresponds to the distance between the first optical axis La1 and the third position py3 along the first axis Ax1.

With respect to the distance distribution of the intensity Ls2 of the second light L2, a distance d02 as shown in FIG. 4 can be defined. The distance d02 is defined as a distance from the second optical axis La2 along the second axis Ax2. The second axis Ax2 extends along the first plane PL1. The second axis Ax2 intersects the second optical axis La2. For example, the second axis Ax2 is perpendicular to the second optical axis La2. The second axis Ax2 may intersect with the second optical axis La2, for example, on the apex of the second surface 21b. Fourth to sixth positions py4 to py6 exist on the second axis Ax2. A fourth distance d4 corresponds to a distance between the second optical axis La2 and the fourth position py4 along the second axis Ax2. A fifth distance d5 corresponds to a distance between the second optical axis La2 and the fifth position py5 along the second axis Ax2. A sixth distance d6 corresponds to a distance between the second optical axis La2 and the sixth position py6 along the second axis Ax2.

Figure 5A:
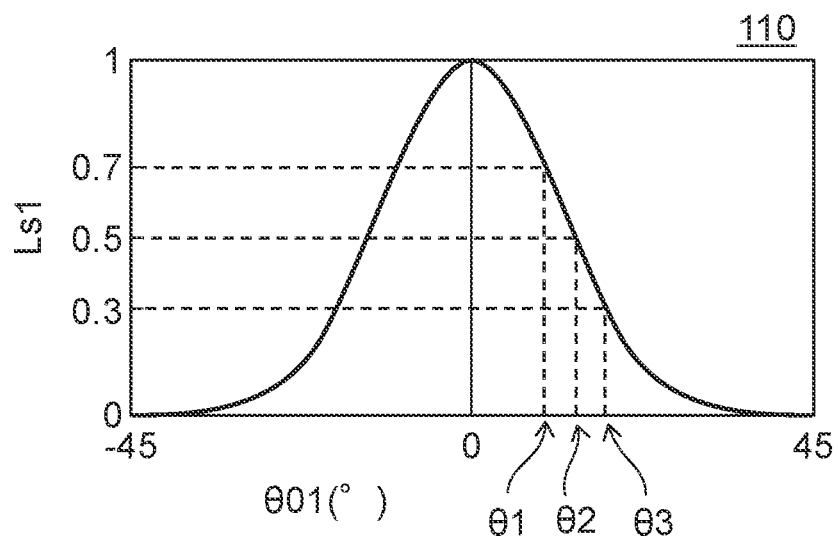
FIG. 5A is a graph of an example of a characteristic of the light source device according to the first embodiment.
Figure 5B:
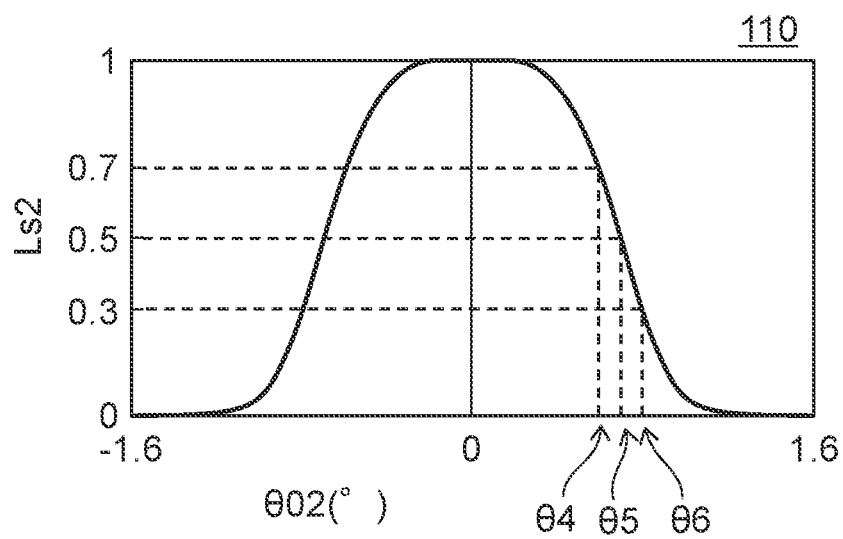
FIG. 5B is a graph of an example of a characteristic of the light source device according to the first embodiment.

FIGS. 5A and 5B are graphs of examples of characteristics of the light source device according to the first embodiment.

The horizontal axis in FIG. 5A indicates the angle θ01 (degrees). The horizontal axis in FIG. 5B indicates the angle θ02 (degrees). The vertical axis in FIG. 5A indicates the intensity Ls1 of the first light L1. The vertical axis in FIG. 5B indicates intensity Ls2 of the second light L2. The intensity Ls1 and the intensity Ls2 are normalized values.

As illustrated in FIG. 5A, when the angle θ01 is 0, the intensity Ls1 of the first light L1 is substantially "1." The intensity Ls1 of the first light L1 when the angle θ01 is 0 corresponds to the value on the first optical axis La1 of the first light L1 (the first value v1). As illustrated in FIG. 5B, when the angle θ02 is 0, the intensity Ls2 of the second light L2 is substantially "1." The intensity Ls2 of the second light L2 when the angle θ02 is 0 corresponds to the value on the second optical axis La2 of the second light L2 (the second value v2).

As illustrated in FIG. 5A, the angle distribution of the intensity Ls1 of the first light L1 becoming incident on the first surface 21a is in a "Gaussian distribution." As illustrated in FIG. 5B, the angular distribution of the intensity Ls2 of the second light L2 emitted from the second surface 21b shows uniform intensity by a wider range of angles than the "Gaussian distribution." The angular distribution of the intensity Ls2 is, for example, in a "top-hat" distribution.

The first lens 21 converts the angular distribution of the intensity Ls1 of the first light L1 in FIG. 5A into the angular distribution of the intensity Ls2 of the second light L2 in FIG. 5B. In the following, a description will be given of an example of parameters relating to the angular distribution of the intensity Ls1 and the intensity Ls2.

As illustrated in FIG. 5A, in the direction at the first angle θ1 from the first optical axis La1, the intensity Ls1 of the first light L1 is 0.7 times as great as the first value v1. In the direction at the second angle θ2 from the first optical axis La1, the intensity Ls1 of the first light L1 is 0.5 times as great as the first value v1. In the direction at the third angle θ3 from the first optical axis La1, the intensity Ls1 of the first light L1 is 0.3 times as great as the first value v1.

As illustrated in FIG. 5B, in the direction at the fourth angle θ4 from the second optical axis La2, the intensity Ls2 of the second light L2 is 0.7 times as great as the second value v2. In the direction at the fifth angle θ5 from the second optical axis La2, the intensity Ls2 of the second light L2 is 0.5 times as great as the second value v2. In the direction at the sixth angle θ6 from the second optical axis La2, the intensity Ls2 of the second light L2 is 0.3 times as great as the second value v2.

The direction at the first angle θ1, the direction at the second angle θ2, the direction at the fourth angle θ4, the direction at the fifth angle θ5, and the direction at the sixth angle θ6 extend in the first plane PL1 that includes the direction at the third angle θ3 and the first optical axis La1.

For example, the first to sixth angles θ1 to θ6 are formed in the first plane PL1, and the first optical axis La1 and extends in the first plane PL1.

As parameters, a first ratio α1 and a second ratio α2 are employed. The first ratio α1 in the present specification refers to a ratio of the absolute value of the difference between the first angle θ1 and the third angle θ3 to the second angle θ2. The second ratio α2 in the present specification refers to a ratio of the absolute value of the difference between the fourth angle θ4 and the sixth angle θ6 to the fifth angle θ5.

The first ratio α1 and the second ratio α2 are represented by:

$$\alpha 1=|\theta 1-\theta 3|/\theta 2$$

$$\alpha 2=|\theta 4-\theta 6|/\theta 5$$

For example, when these ratios are great, the angular distribution of the light intensity approximates "Gaussian distribution-like" distribution. When these ratios are small, the angular distribution of the light intensity approximates "top-hat-like" distribution.

In one embodiment, in the first lens 21, the second ratio α2 is set to be smaller than the first ratio α1. For example, the angular distribution of the intensity Ls2 of the second light L2 output from the first lens 21 approximates "top-hat-like" distribution than the angular distribution of the intensity Ls1 of the first light L1 incident on the first lens 21. For example, the first lens 21 converts the Gaussian-distribution-like angular distribution of the intensity Ls1 of the first light L1 into the top-hat-like angular distribution of the intensity Ls2 of the second light L2.

For example, in the example in FIG. 5A, the first ratio α1 is 0.617. In the example in FIG. 5B, the second ratio α2 is 0.297.

The intensity angular distribution of the second light L2 is narrower than that of the first light L1. For example, when the second light L2 is condensed by the optical element 31 or the like, uniformity of the light intensity distribution (the luminance distribution) in the incident region 31S can be improved. For example, uniformity of light intensity distribution in the quadrangular incident region 31S is increased. According to one embodiment, a light source device that exhibits light intensity distribution of improved uniformity can be provided.

In one embodiment, the first light L1 does not have complete parallel rays. For example, the angular distribution of the intensity Ls1 of the first light L1 is in the Gaussian distribution. For example, the greater the angle θ01 from the first optical axis La1, the lower the intensity Ls1 of the first light L1. The angle θ01, at which the intensity Ls1 of the first light L1 is 0.135 times as great as the first value v1, with respect to the first optical axis La1 in the first plane PL1 is 3 degrees or more.

"0.135 times" corresponds to "$1/e^2$ times" where "e" is the Napier's constant. "e" is approximately 2.7182812814.

In the description below, with respect to the first lens 21, an example of the distance distribution of the intensity Ls1 of the first light L1 and the intensity Ls2 of the second light L2 will be described.

Figure 6A:
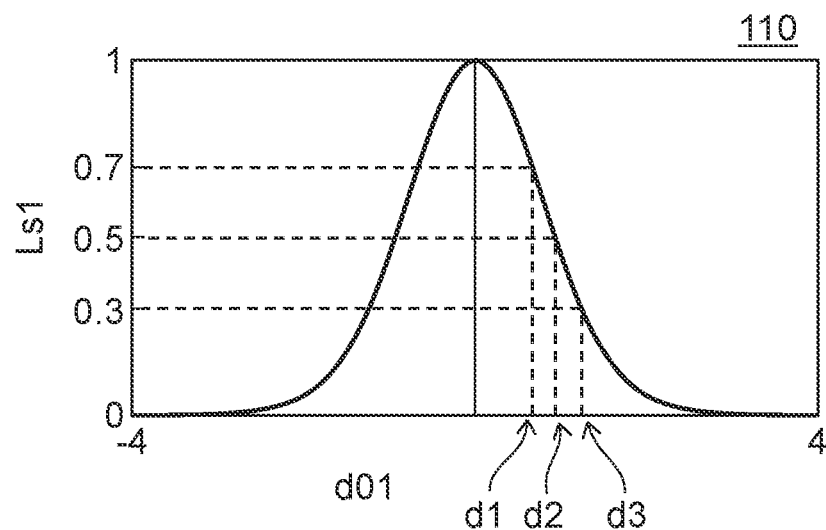
FIG. 6A is a graph of an example of a characteristic of the light source device according to the first embodiment.
Figure 6B:
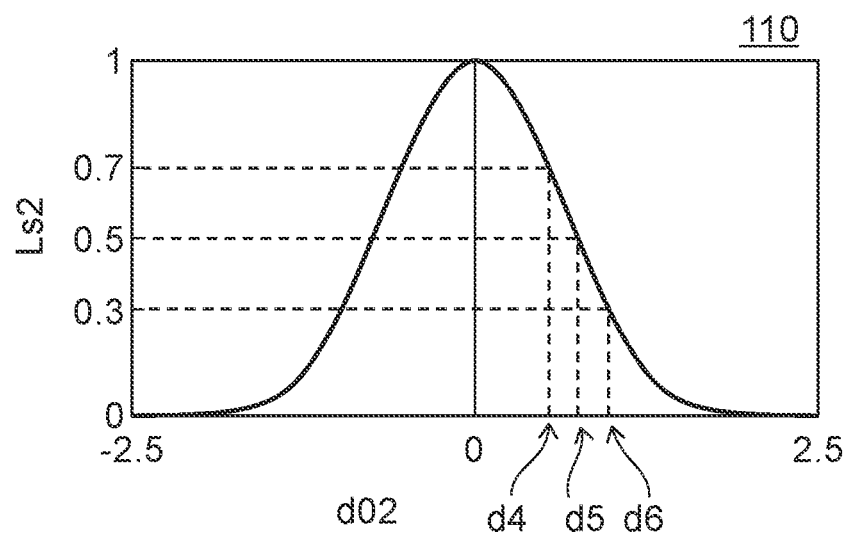
FIG. 6B is a graph of an example of a characteristic of the light source device according to the first embodiment.

FIGS. 6A and 6B are graphs of examples of characteristics of the light source device according to the first embodiment.

The horizontal axis in FIG. 6A indicates the distance d01 (arbitrary unit). As has been described above, the distance d01 in the present specification refers to a distance from the first optical axis La1 in the first plane PL1. The horizontal axis in FIG. 6B indicates the distance d02 (arbitrary unit). As has been described above, the distance d02 in the present specification refers to a distance from the second optical axis La2 along the first plane PL1. The vertical axis in FIG. 6A indicates the intensity Ls1 of the first light L1. The vertical axis in FIG. 6B indicates the intensity Ls2 of the second light L2. The intensity Ls1 and the intensity Ls2 are normalized values.

As illustrated in FIG. 6A, when the distance d01 is 0, the intensity Ls1 of the first light L1 is substantially "1." The intensity Ls1 of the first light L1 when the distance d01 is 0 corresponds to the value on the first optical axis La1 of the first light L1 (the first value v1). As illustrated in FIG. 6B, when the distance d02 is 0, the intensity Ls2 of the second light L2 is substantially "1." The intensity Ls2 of the second light L2 when the distance d02 is 0 corresponds to the value on the second optical axis La2 of the second light L2 (the second value v2).

As illustrated in FIG. 6A, the distance distribution of the intensity Ls1 of the first light L1 becoming incident on the first surface 21a is "Gaussian distribution-like" distribution. As illustrated in FIG. 6B, the distance distribution of the intensity Ls2 of the second light L2 emitted from the second surface 21b is also "Gaussian distribution-like" distribution. An example of parameters relating to the distance distribution (the position distribution) of the intensity Ls1 and the intensity Ls2 will be described below.

As illustrated in FIG. 6A, the intensity Ls1 of the first light L1 at the position at the first distance d1 is 0.7 times as great as the first value v1. As has been described above, the first distance d1 is defined as a distance between the first optical axis La1 and the first position py1 along the first axis Ax1. The intensity Ls1 of the first light L1 at the first position py1 on the first axis Ax1 is 0.7 times as great as the first value v1.

As illustrated in FIG. 6A, the intensity Ls1 of the first light L1 at the position at the second distance d2 is 0.5 times as great as the first value v1. As has been described above, the second distance d2 is defined as a distance between the first optical axis La1 and the second position py2 along the first axis Ax1. The intensity Ls1 of the first light L1 at the second position py2 on the first axis Ax1 is 0.5 times as great as the first value v1.

As illustrated in FIG. 6A, the intensity Ls1 of the first light L1 at the position at the third distance d3 is 0.3 times as great as the first value v1. As has been described above, the third distance d3 is defined as a distance between the first optical axis La1 and the third position py3 along the first axis Ax1. The intensity Ls1 of the first light L1 at the third position py3 on the first axis Ax1 is 0.3 times as great as the first value v1.

As illustrated in FIG. 6B, the intensity Ls2 of the second light L2 at the position at the fourth distance d4 is 0.7 times as great as the second value v2. As has been described above, the fourth distance d4 is defined as a distance between the second optical axis La2 and the fourth position py4 along the second axis Ax2. The intensity Ls2 of the second light L2 at the fourth position py4 on the second axis Ax2 is 0.7 times as great as the second value v2.

As illustrated in FIG. 6B, the intensity Ls2 of the second light L2 at the position at the fifth distance d5 is 0.5 times as great as the second value v2. As has been described above, the fifth distance d5 is defined as a distance between the second optical axis La2 and the fifth position py5 along the second axis Ax2. The intensity Ls2 of the second light L2 at the fifth position py5 on the second axis Ax2 is 0.5 times as great as the second value v2.

As illustrated in FIG. 6B, the intensity Ls2 of the second light L2 at the position at the sixth distance d6 is 0.3 times as great as the second value v2. As has been described above, the sixth distance d6 is defined as a distance extending between the second optical axis La2 and the sixth position py6 along the second axis Ax2. The intensity Ls2 of the second light L2 at the sixth position py6 on the second axis Ax2 is 0.3 times as great as the second value v2.

For example, as parameters, a third ratio α3 and a fourth ratio α4 are employed. The third ratio α3 as used herein refers to a ratio of the absolute value of the difference between the first distance d1 and the third distance d3 to the second distance d2. The fourth ratio α4 as used herein refers to a ratio of the absolute value of the difference between the fourth distance d4 and the sixth distance d6 to the fifth distance d5.

The third ratio α3 and the fourth ratio α4 are represented by:

$$\alpha 3=|d1-d3|/d2$$

$$\alpha 4=|d4-d6|/d5$$

For example, when these ratios are great, the distance distribution (or the position distribution) of the light intensity approximates "Gaussian distribution-like" distribution. When these ratios are small, the distance distribution (or the position distribution) of the light intensity approximates "top-hat-like" distribution.

In one embodiment, the degree of the difference between the third ratio α3 and the fourth ratio α4 relating to the distance distribution is smaller than the degree of the difference between the first ratio α1 and the second ratio α2 relating to the angular distribution. For example, in the example of FIG. 6A, the third ratio α3 is 0.576. In the example of FIG. 6B, the fourth ratio α4 is 0.573.

For example, in the first lens 21, the absolute value of the difference between the first ratio α1 and the second ratio α2 is greater than the absolute value of the difference between the third ratio α3 and the fourth ratio α4. In the example in FIGS. 5A and 5B, the difference between the first ratio α1 and the second ratio α2 is 0.32. In the example in FIGS. 6A and 6B, the difference between the third ratio α3 and the fourth ratio α4 is 0.003.

Thus, in one embodiment, the difference between the first ratio α1 and the second ratio α2 relating to the angular distribution is greater than the difference between the third ratio α3 and the fourth ratio α4 relating to the distance distribution. In the intensity Ls2 of the second light L2, uniformity in the angular distribution is increased. According to one embodiment, a light source device that exhibits light intensity distribution of improved uniformity can be provided.

For example, a reference example of an optical system using a collimate lens or the like is considered. Such a reference example generally employs the idea of having "top-hat-like" distance distribution of light intensity. Such an approach usually does not take into consideration of the angular distribution of the light intensity.

In contrast, according to embodiments of the present invention, the uniformity of the angular distribution of the light intensity can be improved. For example, the second ratio α2 relating to the angular distribution of the intensity Ls2 of the emitted second light L2 is set to be smaller than the first ratio α1 relating to the angular distribution of the intensity Ls1 of the incident first light L1.

In one embodiment, with the small second ratio α2, for example, when the second light L2 is condensed by the optical element 31 or the like, uniformity of light intensity distribution at the incident region 31S can be increased. For example, in the quadrangular incident region 31S uniformity of the light intensity distribution is increased. According to one embodiment, a light source device that exhibits light intensity distribution of improved uniformity can be provided.

For example, the absolute value of the difference between the first ratio α1 and the second ratio α2 is greater than 0.3. For example, the second ratio α2 is 0.297 or less.

The first to sixth angles θ1 to θ6 are angles formed in the first plane PL1. The first to sixth distances d1 to d6 are distances in the first plane PL1. When the first light L1 is a first laser light, the first plane PL1 may extend, for example, along the fast axis Af of the first laser light. The first plane PL1 may extend, for example, along the slow axis As of the first laser light.

For example, the angle θ01, at which the intensity Ls1 of the first light L1 is 0.135 times as great as the first value v1, with respect to the first optical axis La1 in the first plane PL1 is, for example, 15 degrees or more. In the fast axis Af, for example, the angle θ01 is 15 degrees or more. In one embodiment, the angle θ01, at which the intensity Ls1 of the first light L1 is 0.135 times as great as the first value v1, with respect to the first optical axis La1 in the first plane PL1 may be in a range of, for example, 3 degrees to 40 degrees.

Figure 7A:
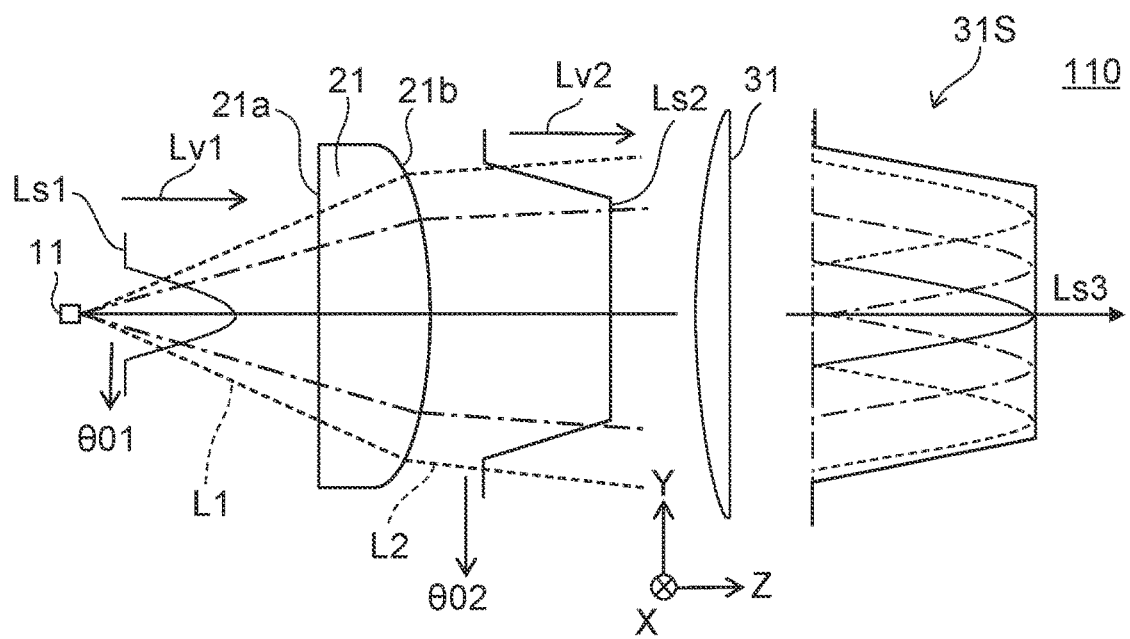
FIG. 7A is a schematic diagram of an example of a characteristic of the light source device.
Figure 7B:
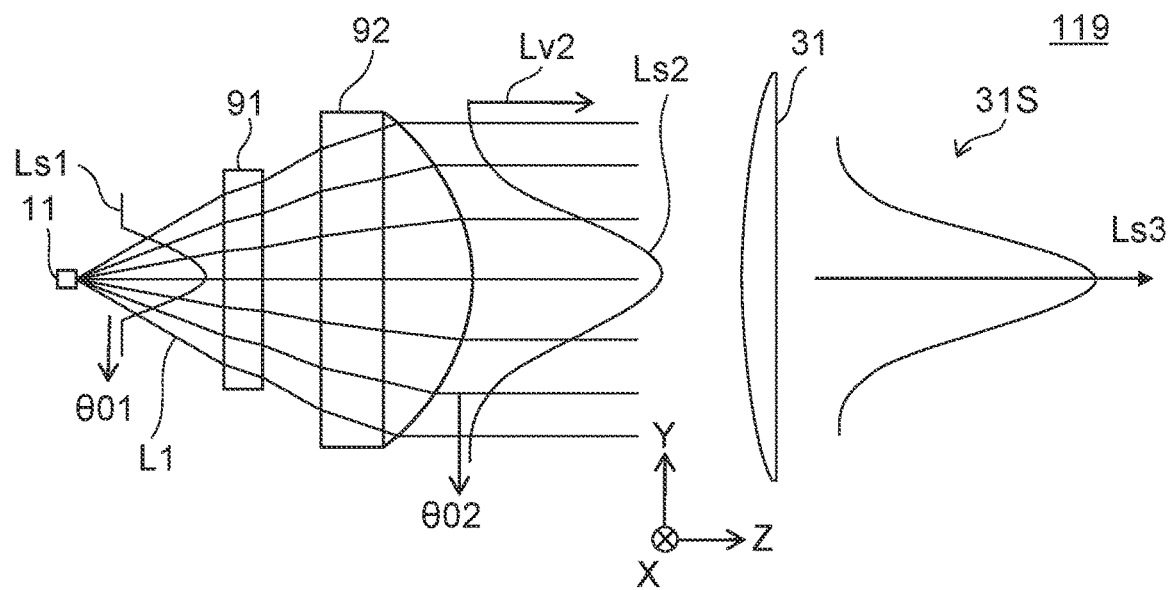
FIG. 7B is a schematic diagram of an example of a characteristic of the light source device.

FIGS. 7A and 7B are schematic diagrams of examples of characteristics of the light source device.

FIG. 7A corresponds to the light source device 110 according to one embodiment. FIG. 7B corresponds to a light source device 119 of a reference example. The light source device 119 uses a collimating optical system. FIGS. 7A and 7B illustrate the angular distribution of the intensity Ls1 of the first light L1 and the angular distribution of the intensity Ls2 of the second light L2.

As illustrated in FIG. 7B, in the light source device 119 of the reference example, the first light L1 emitted from the first light source 11 is incident on a first optical component 91, and then on a second optical component 92. The first optical component 91 and the second optical component 92 function as collimate lenses. In the light source device 119, when the angular distribution of the intensity Ls1 of the first light L1 is "Gaussian distribution-like" distribution, the angular distribution of the intensity Ls2 of the second light L2 emitted from the second optical component 92 is also "Gaussian distribution-like" distribution. The second light L2 having such a characteristic is condensed by the optical element 31 to the condensing position 31P. The intensity Ls3 at the incident region 31S of the condensing position 31P is distributed in a Gaussian-distribution-like distribution. In the light source device 119, uniformity of the light intensity distribution lacks is low.

As illustrated in FIG. 7A, in the light source device 110 according to one embodiment, when the angular distribution of the intensity Ls1 of the first light L1 is "Gaussian distribution-like" distribution, the angular distribution of the intensity Ls2 of the second light L2 emitted from the first lens 21 is "top-hat-like" distribution. When the second light L2 having such a characteristic is condensed by the optical element 31 to the condensing position 31P, the intensity Ls3 at the incident region 31S of the condensing position 31P becomes "top-hat-like." In one embodiment, uniformity of the light intensity distribution is improved.

In one example described above, the first plane PL1 extends along the fast axis Af of the first light L1. An example of the optical characteristic along the slow axis As will be described below.

Figure 8:
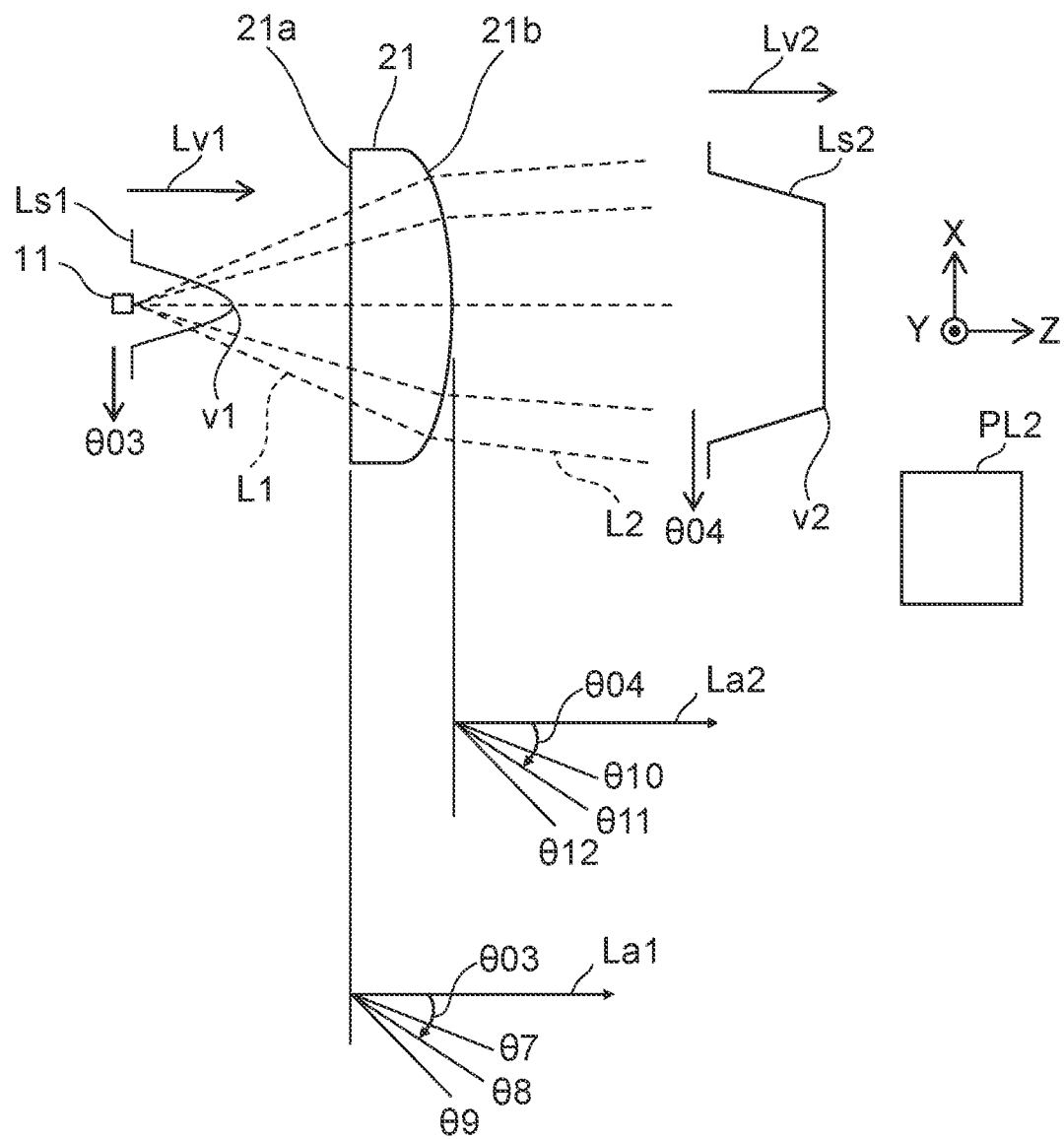
FIG. 8 is a schematic diagram of the light source device according to the first embodiment.
Figure 9:
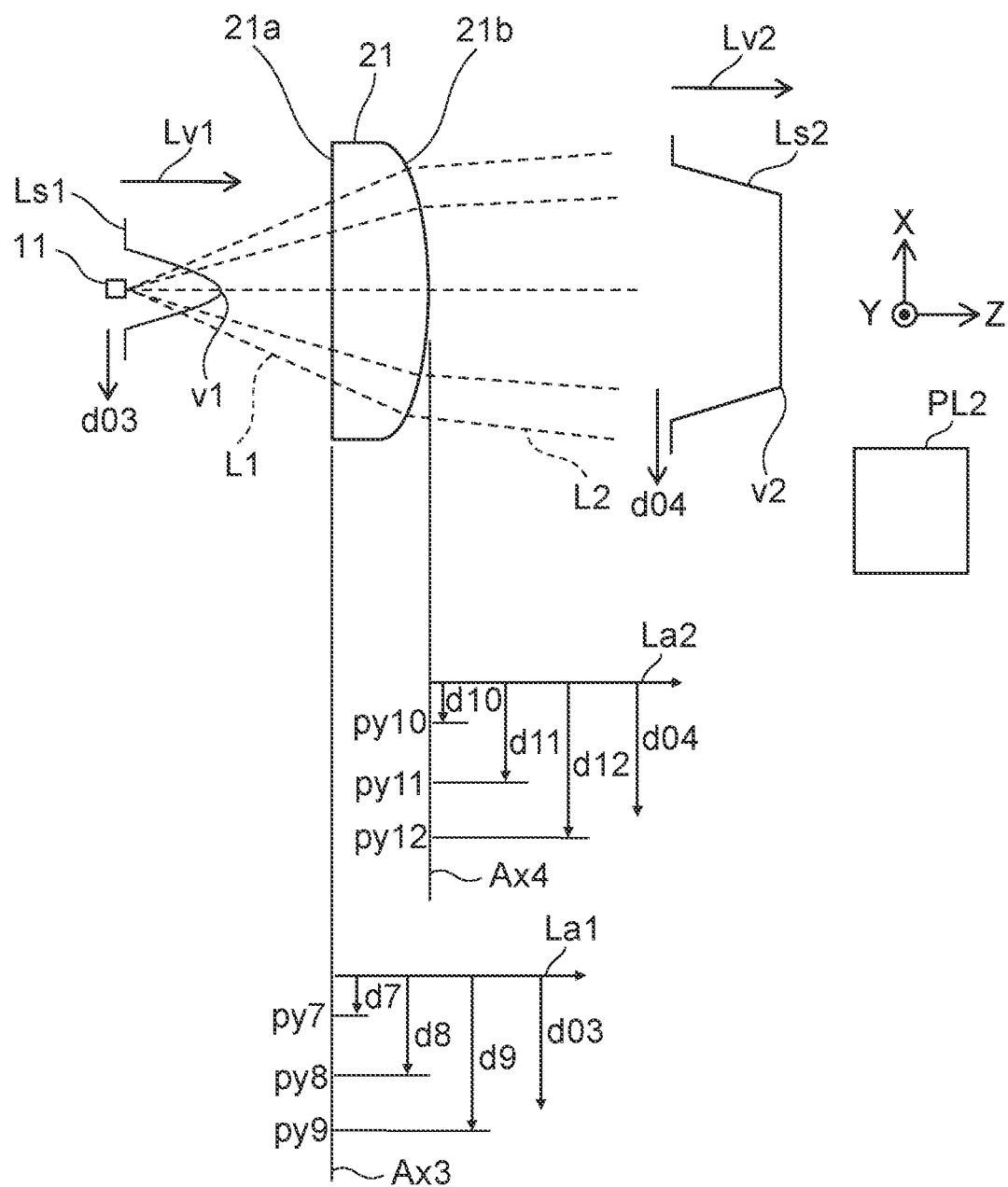
FIG. 9 is a schematic diagram of the light source device according to the first embodiment.

FIGS. 8 and 9 schematically illustrate the light source device according to the first embodiment.

FIGS. 8 and 9 are schematic diagrams taken along the second plane PL2. The second plane PL2 extends along, for example, the X-Z plane.

FIGS. 8 and 9 schematically illustrate the distribution of the intensity Ls1 of the first light L1 in the X-axis direction. An axis Lv1 in the right-left direction in FIGS. 8 and 9 corresponds to the intensity Ls1 of the first light L1. As illustrated in FIGS. 8 and 9, the intensity Ls1 of the first light L1 has the first value v1 on the first optical axis La1 of the first light L1.

FIGS. 8 and 9 schematically illustrate the distribution of the intensity Ls2 of the second light L2 in the X-axis direction. An axis Lv2 in the right-left direction in FIGS. 8 and 9 corresponds to the intensity Ls2 of the second light L2. As illustrated in FIGS. 8 and 9, the intensity Ls2 of the second light L2 has the second value v2 on the second optical axis La2 of the second light L2.

With respect to the angular distribution of the intensity Ls1 of the first light L1, an angle θ03 as shown in FIG. 8 can be defined. The angle θ03 is defined as an angle with respect to the first optical axis La1 on the second plane PL2. The angle θ03 includes, for example, seventh to ninth angles θ7 to 09 which will be described below.

With respect to the angular distribution of the intensity Ls2 of the second light L2, an angle θ04 as shown in FIG. 8 can be defined. The angle θ04 is an angle with respect to the second optical axis La2 in the second plane PL2. The angle θ04 includes, for example, tenth to twelfth angles θ10 to 012 which will be described below.

With respect to the distance distribution of the intensity Ls1 of the first light L1, a distance d03 as shown in FIG. 9 can be defined. The distance d03 is defined as a distance from the first optical axis La1 along the third axis Ax3. The third axis Ax3 extends in the second plane PL2. The third axis Ax3 intersects the first optical axis La1. For example, the third axis Ax3 is perpendicular to the first optical axis La1 and intersects the first axis Ax1. For example, the third axis Ax3 is perpendicular to the first axis Ax1. The third axis Ax3 may intersect with the first optical axis La1, for example, on the first surface 21*a*. Seventh to ninth positions py7 to py9 exist on the third axis Ax3. The seventh distance d7 corresponds to the distance between the first optical axis La1 and the seventh position py7 along the third axis Ax3. The eighth distance d8 corresponds to the distance between the first optical axis La1 and the eighth position py8 along the third axis Ax3. The ninth distance d9 corresponds to the distance between the first optical axis La1 and the ninth position py9 along the third axis Ax3.

With respect to the distance distribution of the intensity Ls2 of the second light L2, a distance d04 as shown in FIG. 9 can be defined. The distance d04 is defined as a distance from the second optical axis La2 along the fourth axis Ax4. The fourth axis Ax4 extends in the second plane PL2. The fourth axis Ax4 intersects the second optical axis La2. For example, the fourth axis Ax4 is perpendicular to the first optical axis La1 and intersects the second axis Ax2. For example, the fourth axis Ax4 is perpendicular to the second axis Ax2. The second axis Ax4 may intersect with the second optical axis La2, for example, on the apex of the second surface 21*b*. Tenth to twelfth positions py10 to py12 exist on the fourth axis Ax4. The tenth distance d10 corresponds to the distance between the second optical axis La2 and the tenth position py10 along the fourth axis Ax4. The eleventh distance d11 corresponds to the distance between the second optical axis La2 and the eleventh position py11 along the fourth axis Ax4. The twelfth distance d12 corresponds to the distance between the second optical axis La2 and the twelfth position py12 along the fourth axis Ax4.

Figure 10A:
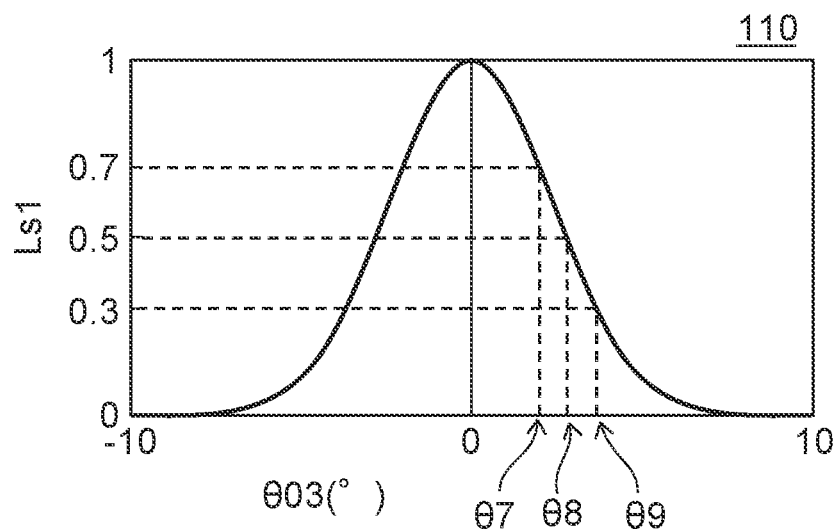
FIG. 10A is a graph of an example of a characteristic of the light source device according to the first embodiment.
Figure 10B:
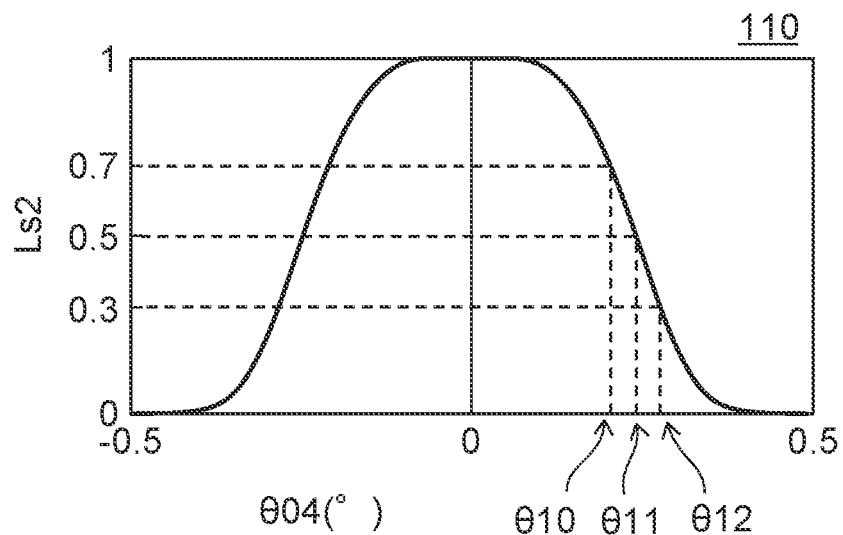
FIG. 10B is a graph of an example of a characteristic of the light source device according to the first embodiment.

FIGS. 10A and 10B are graphs of examples of characteristics of the light source device according to the first embodiment.

The horizontal axis in FIG. 10A indicates the angle θ03 (degrees). The horizontal axis in FIG. 10B indicates the angle θ04 (degrees). The vertical axis in FIG. 10A indicates the intensity Ls1 of the first light L1. The vertical axis in FIG. 10B indicates the intensity Ls2 of the second light L2. The intensity Ls1 and the intensity Ls2 are normalized values.

As illustrated in FIG. 10A, the intensity Ls1 of the first light L1 when the angle θ01 is 0 is substantially "1", and corresponds to the value (the first value v1) on the first optical axis La1 of the first light L1. As illustrated in FIG. 10B, the intensity Ls2 of the second light L2 when the angle θ02 is 0 is substantially "1", and corresponds to the value (the second value v2) on the second optical axis La2 of the second light L2.

An example of parameters relating to the angular distribution of the intensity Ls1 and the intensity Ls2 in the direction in the second plane PL2 will be described below.

As illustrated in FIG. 10A, the intensity Ls1 of the first light L1 in the direction at the seventh angle θ7 from the first optical axis La1 is 0.7 times as great as the first value v1. The intensity Ls1 of the first light L1 in the direction at the eighth angle θ8 from the first optical axis La1 is 0.5 times as great as the first value v1. The intensity Ls1 of the first light L1 in the direction at the ninth angle θ9 form the first optical axis La1 is 0.3 times as great as the first value v1.

As illustrated in FIG. 10B, the intensity Ls2 of the second light L2 in the direction at the tenth angle θ10 from the second optical axis La2 is 0.7 times as great as the second value v2. The intensity Ls2 of the second light L2 in the direction at the eleventh angle θ11 from the second optical axis La2 is 0.5 times as great as the second value v2. The intensity Ls2 of the second light L2 in the direction at the twelfth angle θ12 from the second optical axis La2 is 0.3 times as great as the second value v2.

The direction at the seventh angle θ7, the direction at the eighth angle θ8, the direction at the tenth angle θ1, the direction at the eleventh angle θ11, and the direction at the twelfth angle θ12 extend in the second plane PL2. The second plane PL2 includes the direction at the ninth angle θ9 and the first optical axis La1, and intersects the first plane PL1. For example, the second plane PL2 is perpendicular to the first plane PL1.

As parameters, a fifth ratio α5 and a sixth ratio α6 are employed. The "fifth ratio α5" as used herein refers to a ratio of the absolute value of the difference between the seventh angle θ7 and the ninth angle θ9 to the eighth angle θ8. The "sixth ratio α6" as used herein refers to a ratio of the absolute value of the difference between the tenth angle θ10 and the twelfth angle θ12 to the eleventh angle θ11.

The fifth ratio α5 and the sixth ratio α6 are represented by:

$$\alpha 5 = |\theta 7 - \theta 9|/\theta 8$$

$$\alpha 6 = |\theta 10 - \theta 12|/\theta 11$$

For example, when these ratios are high, the angular distribution of the light intensity approximates "Gaussian distribution-like" distribution. When these ratios are small, the angular distribution of the light intensity approximates "top-hat-like" distribution.

In one embodiment, in the first lens 21, the sixth ratio α6 is set to be smaller than the fifth ratio α5. In the example in FIGS. 10A and 10B, the fifth ratio α5 is 0.595 and the sixth ratio α6 is 0.297.

In one embodiment, in the direction in the second plane PL2, the sixth ratio α6 is smaller than the fifth ratio α5. In the direction in the second plane PL2, when the angular distribution of the intensity Ls1 of the first light L1 is "Gaussian distribution-like" distribution, the angular distribution of the intensity Ls2 of the second light L2 emitted from the second optical component 92 is "top-hat-like" distribution. For example, when the second light L2 having such a characteristic is condensed by the optical element 31 to the condensing position 31P, the intensity Ls3 at the incident region 31S of the condensing position 31P is in a "top-hat-like" distribution. In one embodiment, uniformity of the light intensity distribution shows is increased.

For example, with respect to the seventh to ninth angles θ7 to θ9, the angle θo3, at which the intensity Ls1 of the first light L1 becomes 0.135 times as great as the first value v1, with respect to the first optical axis La1 in the second plane PL2 is, for example, 3 degrees or more. The angle θo3 is, for example, 40 degrees or less.

Figure 11A:
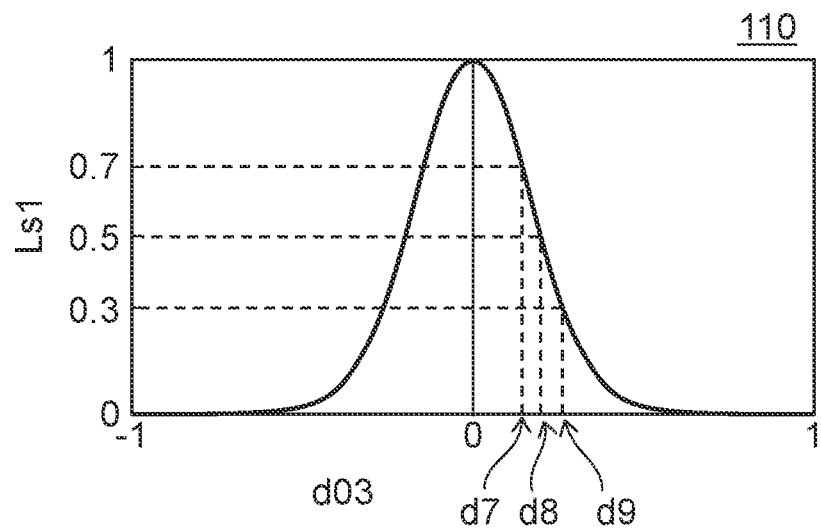
FIG. 11A is a graph of an example of a characteristic of the light source device according to the first embodiment.
Figure 11B:
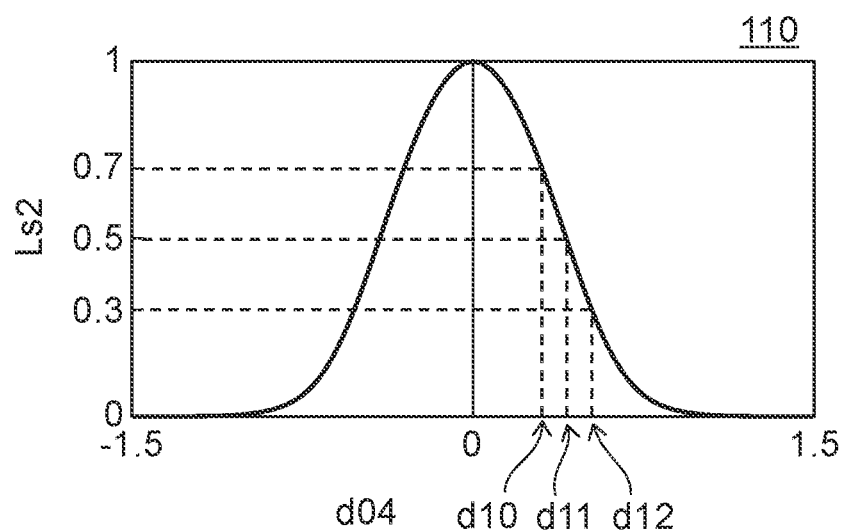
FIG. 11B is a graph of an example of a characteristic of the light source device according to the first embodiment.

FIGS. 11A and 11B graphs of examples of characteristics of the light source device according to the first embodiment.

The horizontal axis in FIG. 11A indicates the distance d03 (arbitrary unit). The distance d03 is defined as a distance from the first optical axis La1 in the second plane PL2. The horizontal axis in FIG. 11B indicates the distance d04 (arbitrary unit). The distance d04 is defined as a distance from the second optical axis La2 in the second plane PL2. The vertical axis in FIG. 11A indicates the intensity Ls1 of the first light L1. The vertical axis in FIG. 11B indicates the intensity Ls2 of the second light L2. The intensity Ls1 and the intensity Ls2 are normalized values.

As illustrated in FIG. 11A, the intensity Ls1 of the first light L1 when the distance d03 is 0 is substantially "1", and corresponds to the value (the first value v1) on the first optical axis La1 of the first light L1. As illustrated in FIG. 11B, the intensity Ls2 of the second light L2 when the distance d04 is 0 is substantially "1", and corresponds to the value (the second value v2) on the second optical axis La2 of the second light L2.

An example of parameters relating to the distance distribution (the position distribution) of the intensity Ls1 and the intensity Ls2 in the direction in the second plane PL2 will be described below.

As illustrated in FIG. 11A, the intensity Ls1 of the first light L1 at the position at the seventh distance d7 is 0.7 times as great as the first value v1. As has been described above, the seventh distance d7 refers to a distance between the first optical axis La1 and the seventh position py7 along the third axis Ax3. The intensity Ls1 of the first light L1 at the seventh position py7 on the third axis Ax3 is 0.7 times as great as the first value v1.

As illustrated in FIG. 11A, the intensity Ls1 of the first light L1 at the position at the eighth distance d8 is 0.5 times as great as the first value v1. As has been described above, the eighth distance d8 refers to a distance between the first optical axis La1 and the eighth position py8 along the third axis Ax3. The intensity Ls1 of the first light L1 at the eighth position py8 on the third axis Ax3 is 0.5 times as great as the first value v1.

As illustrated in FIG. 11A, the intensity Ls1 of the first light L1 at the position at the ninth distance d9 is 0.3 times as great as the first value v1.

As has been described above, the ninth distance d9 refers to a distance between the first optical axis La1 and the ninth position py9 along the third axis Ax3. The intensity Ls1 of the first light L1 at the ninth position py9 on the third axis Ax3 is 0.3 times as great as the first value v1.

As illustrated in FIG. 11B, the intensity Ls2 of the second light L2 at the position at the tenth distance d10 is 0.7 times as great as the second value v2. As has been described above, the tenth distance d10 refers to a distance between the second optical axis La2 and the tenth position py10 along the fourth axis Ax4. The intensity Ls2 of the second light L2 at the tenth position py10 on the fourth axis Ax4 is 0.7 times as great as the second value v2.

As illustrated in FIG. 11B, the intensity Ls2 of the second light L2 at the position at the eleventh distance d11 is 0.5 times as great as the second value v2. As has been described above, the eleventh distance d11 refers to a distance between the second optical axis La2 and the eleventh position py11 along the fourth axis Ax4. The intensity Ls2 of the second light L2 at the eleventh position py11 on the fourth axis Ax4 is 0.5 times as great as the second value v2.

As illustrated in FIG. 11B, the intensity Ls2 of the second light L2 at the position at the twelfth distance d12 is 0.3 times as great as the second value v2. As has been noted, the twelfth distance d12 is the distance between the second optical axis La2 and the twelfth position py12 along the fourth axis Ax4. The intensity Ls2 of the second light L2 at the twelfth position py12 on the fourth axis Ax4 is 0.3 times as great as the second value v2.

For example, as parameters, a seventh ratio α7 and an eighth ratio α8 are employed. The seventh ratio α7 as used herein refers to a ratio of the absolute value of the difference between the seventh distance d7 and the ninth distance d9 to the eighth distance d8. The eighth ratio α8 as used herein refers to a ratio of the absolute value of the difference between the tenth distance d10 and the twelfth distance d12 to the eleventh distance d11.

The seventh ratio α7 and the eighth ratio α8 are represented by:

$\alpha7=|d7-d9|/d8$ $\alpha8=|d10-d12|/d11$

For example, when these ratios are great, the distance distribution (or the position distribution) of the light intensity approximates "Gaussian distribution-like" distribution. When these ratios are small, the distance distribution (or the position distribution) of the light intensity is a "top-hat-like" distribution.

In one embodiment, in the first lens 21, the absolute value of the difference between the fifth ratio α5 and the sixth ratio α6 is set to be greater than the absolute value of the difference between the seventh ratio α7 and the eighth ratio α8. In the example in FIGS. 11A and 11B, the seventh ratio α7 is 0.61 and the eighth ratio α8 is 0.552. Accordingly, in the example in FIGS. 10A, 10B, 11A, and 11B, the difference (absolute value) between the fifth ratio and the sixth ratio is 0.298 and the difference (absolute value) between the seventh ratio and the eighth ratio is 0.058.

Also in the direction in the second plane PL2, the degree of the difference between the fifth ratio α5 and the sixth ratio α6 relating to the angular distribution is greater than the degree of the difference between the seventh ratio α7 and the eighth ratio α8 relating to the distance distribution. In the direction in the second plane PL2 also, when the second light L2, having light intensity of top-hat-like angular distribution, is condensed by the optical element 31 at the condensing position 31P, the intensity Ls3 at the incident region 31S of the condensing position 31P is "top-hat-like"

angular distribution in the direction corresponding to the second plane PL2. According to one embodiment, a light source device that exhibits light intensity distribution of improved uniformity can be provided.

In one example, for example, the absolute value between the fifth ratio α5 and the sixth ratio α6 is 0.3 or more. For example, the sixth ratio α6 is 0.297 or less.

For example, the angle θ03, at which the intensity Ls1 of the first light L1 becomes 0.135 times as great as the first value v1, from the first optical axis La1 in the second plane PL2 may be in a range of, for example, 3 degrees to 40 degrees.

For example, when the first light L1 is the first laser light, the first plane PL1 extends along the fast axis Af of the first laser light and the second plane PL2 extends along the slow axis As of the first laser light.

Figure 12:
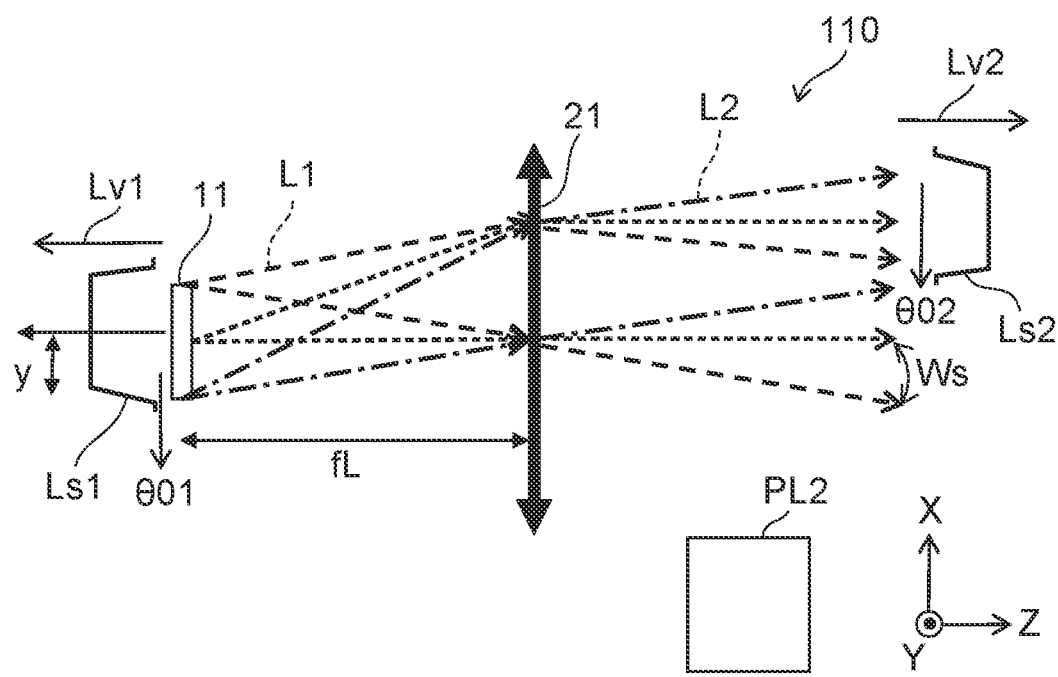
FIG. 12 is a schematic diagram of the light source device according to the first embodiment.

FIG. 12 is a schematic diagram of the light source device according to the first embodiment.

In the light source device 110 according to one embodiment, the focal length of the first lens 21 is referred to as the focal length fL. The length ½ as great as a length in the second plane PL2 of the first light source 11 is referred to as the length y. The angular distribution width Ws in the second plane PL2 of the second light L2 emitted from the first lens 21 is, for example, greater than a value of 1.5 times as great as arctan (y/fL). The angular distribution width Ws corresponds to, for example, the angle θ04, at which the intensity Ls2 of the second light L2 is 0.135 times as great as the second value v2 of the intensity Ls2 of the second light L2 at the second optical axis La2.

For example, a reference example that uses a collimating optical system is considered. In this reference example, by defocusing, a component in a "Gaussian distribution-like" distribution along the slow axis As of the first light L1 is deformed to become "top-hat-like" distribution. In order to obtain the "top-hat-like" distribution by defocusing, the angular distribution width Ws is 1.3 times or less as great as arctan (y/fL). In such a reference example, it is not easy to realize the angular distribution width Ws of at least 1.5 times as great as arctan (y/fL).

Instead of the technical idea of using a collimating optical system, embodiments of the present invention employs the technical idea of controlling the angular distribution. According to one embodiment, the angular distribution width Ws can be 1.5 times as great as arctan (y/fL) or greater.

According to certain embodiments, the "top-hat-like" distribution can be obtained while, for example, increasing the angle of light.

FIGS. 13A, 13B, 14A, 14B, 15A, 15B, 16A, and 16B are graphs of examples of characteristics of the light source device according to the first embodiment.

Figure 13A:
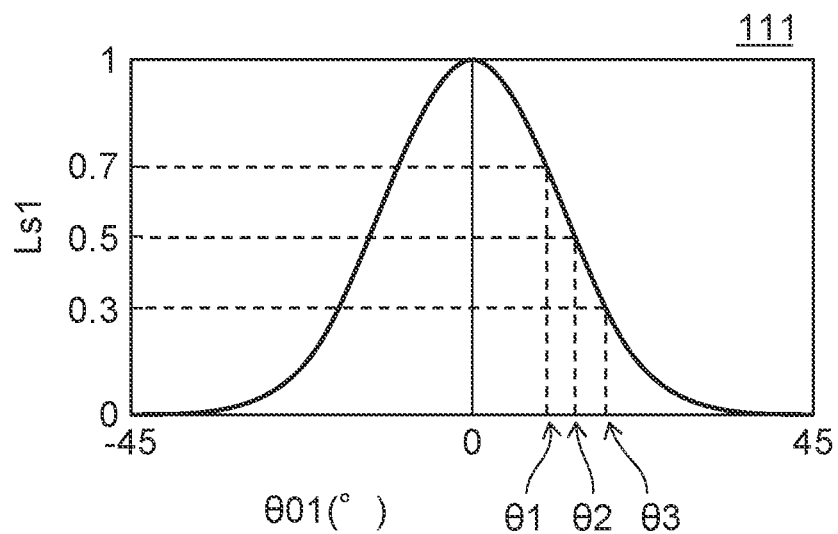
FIG. 13A is a graph of an example of a characteristic of the light source device according to the first embodiment.
Figure 13B:
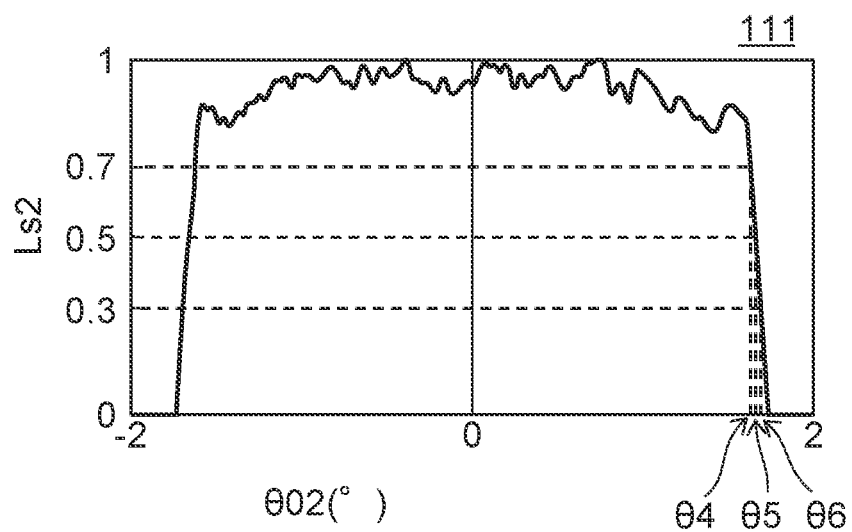
FIG. 13B is a graph of an example of a characteristic of the light source device according to the first embodiment.
Figure 14A:
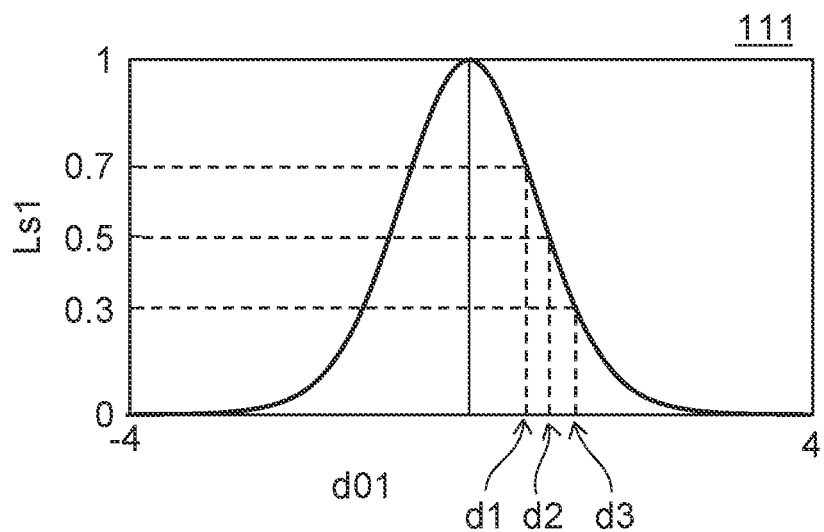
FIG. 14A is a graph of an example of a characteristic of the light source device according to the first embodiment.
Figure 14B:
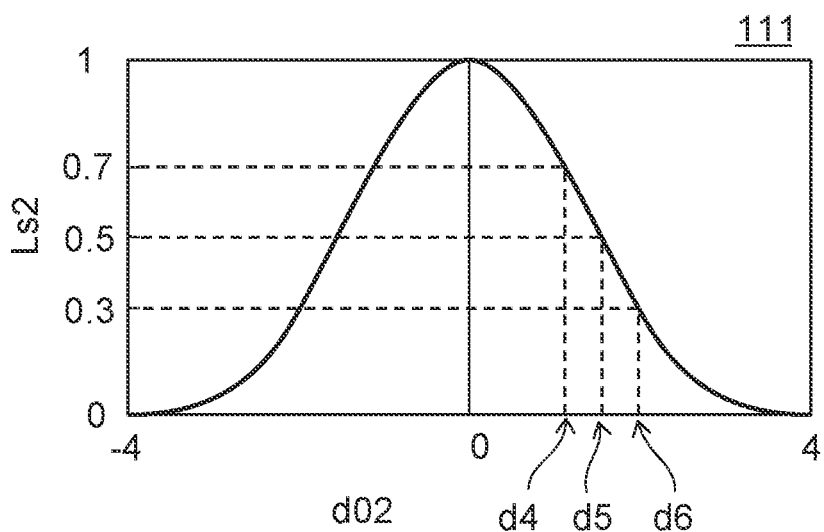
FIG. 14B is a graph of an example of a characteristic of the light source device according to the first embodiment.
Figure 15A:
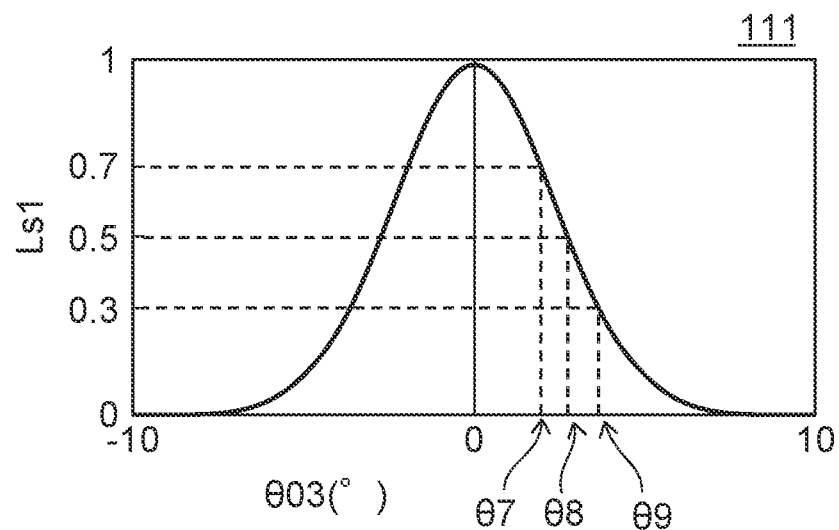
FIG. 15A is a graph of an example of a characteristic of the light source device according to the first embodiment.
Figure 15B:
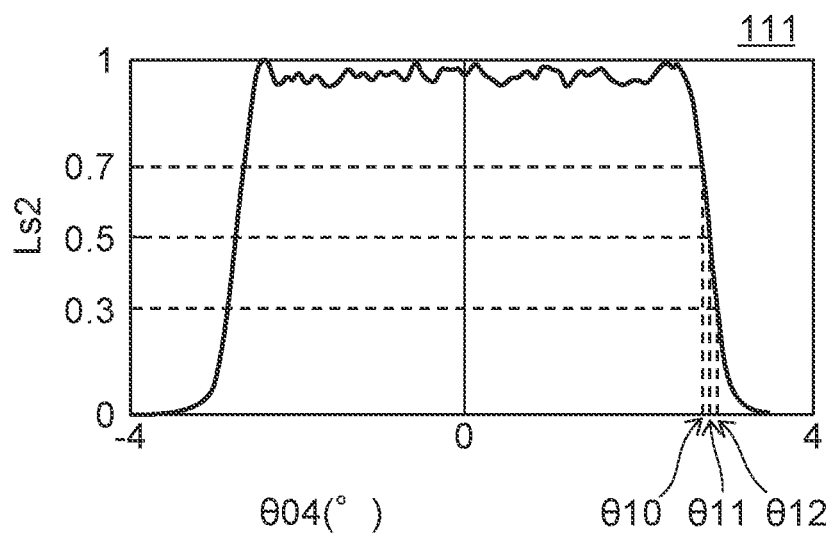
FIG. 15B is a graph of an example of a characteristic of the light source device according to the first embodiment.
Figure 16A:
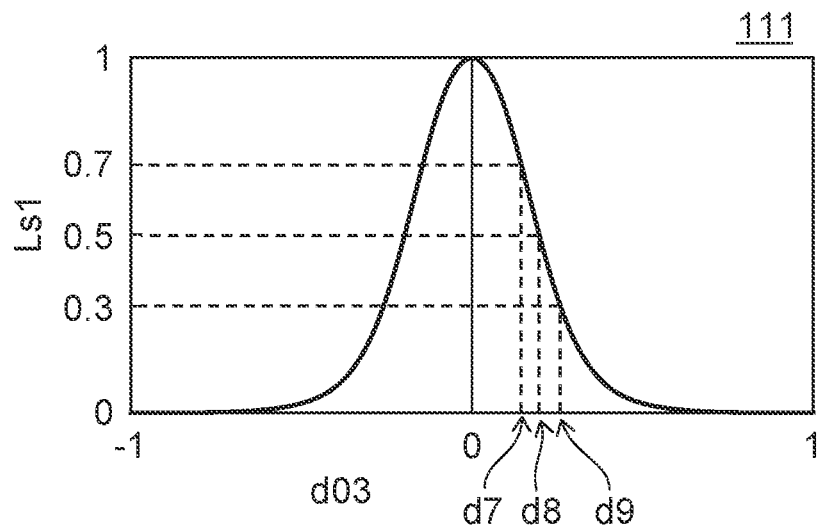
FIG. 16A is a graph of an example of a characteristic of the light source device according to the first embodiment.
Figure 16B:
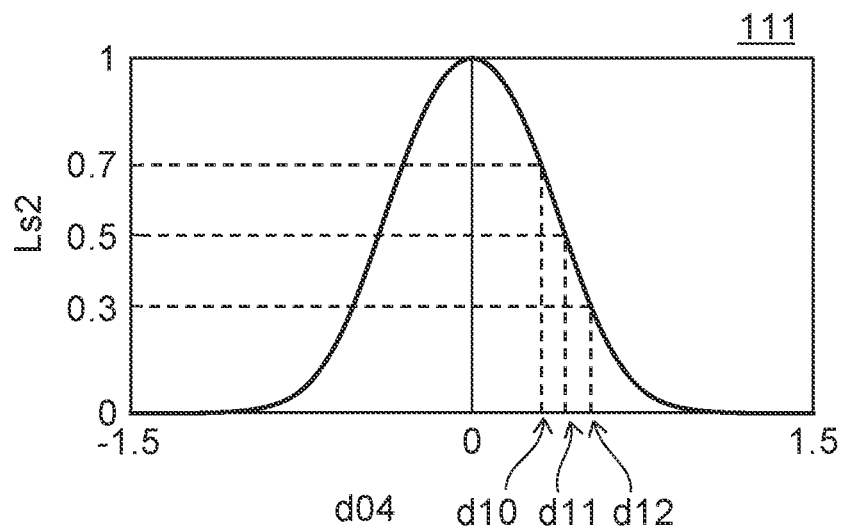
FIG. 16B is a graph of an example of a characteristic of the light source device according to the first embodiment.
Figure 17A:
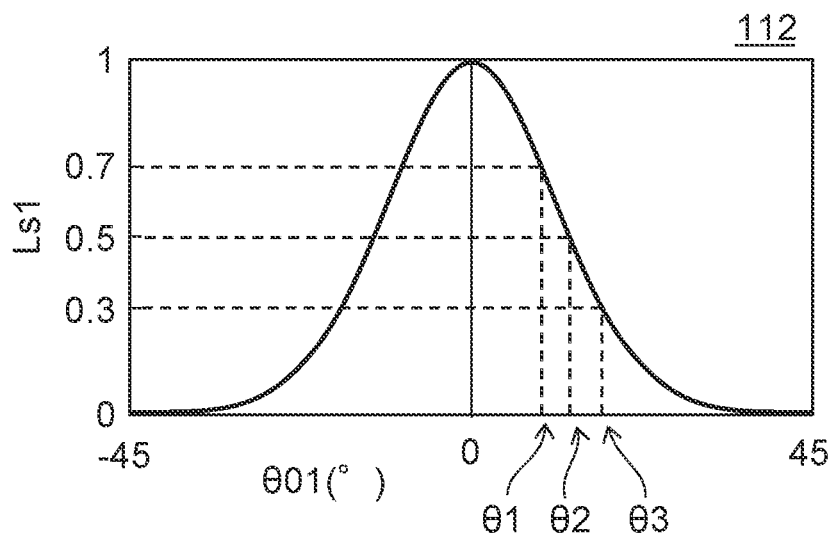
FIG. 17A is a graph of an example of a characteristic of the light source device according to the first embodiment.
Figure 17B:
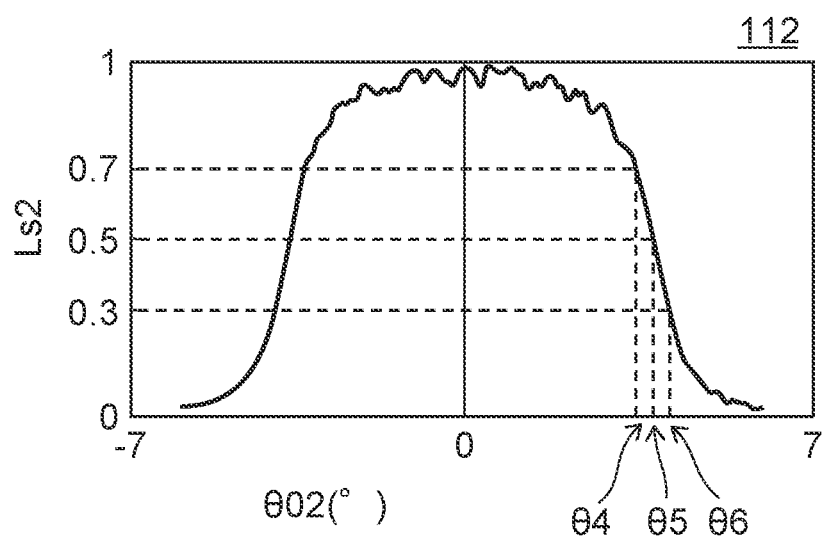
FIG. 17B is a graph of an example of a characteristic of the light source device according to the first embodiment.
Figure 18A:
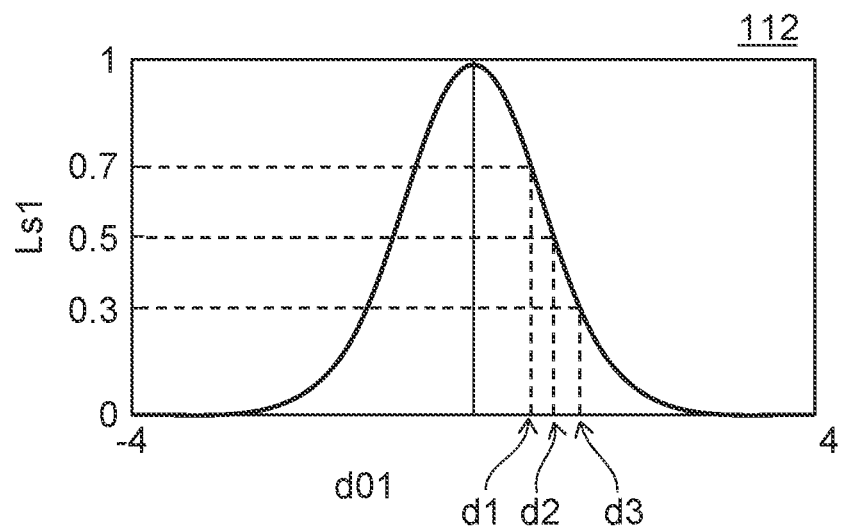
FIG. 18A is a graph of an example of a characteristic of the light source device according to the first embodiment.
Figure 18B:
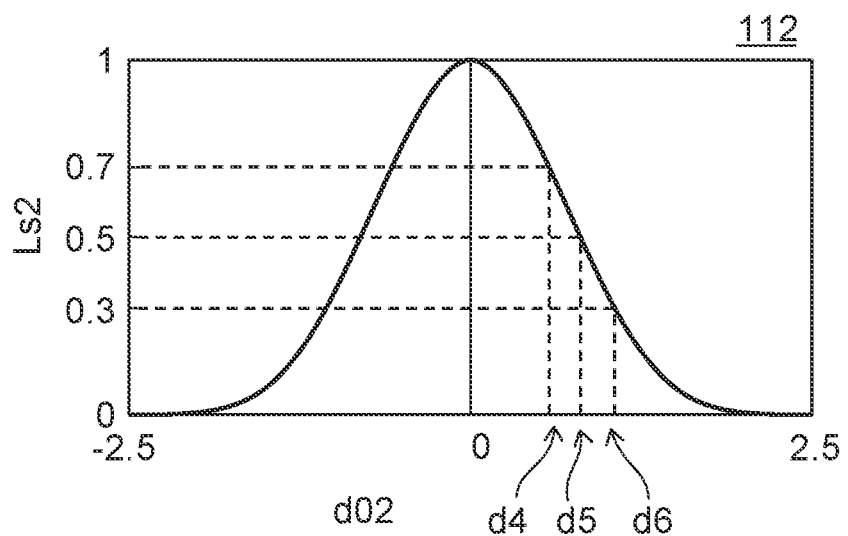
FIG. 18B is a graph of an example of a characteristic of the light source device according to the first embodiment.
Figure 19A:
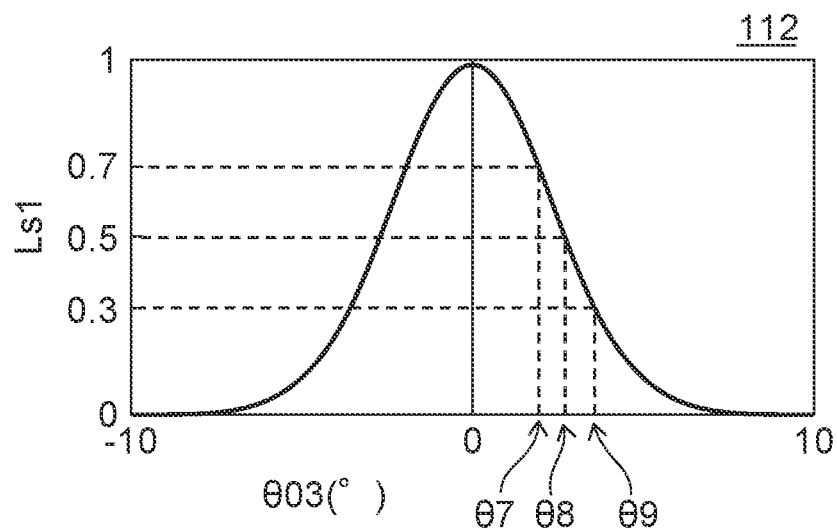
FIG. 19A is a graph of an example of a characteristic of the light source device according to the first embodiment.
Figure 19B:
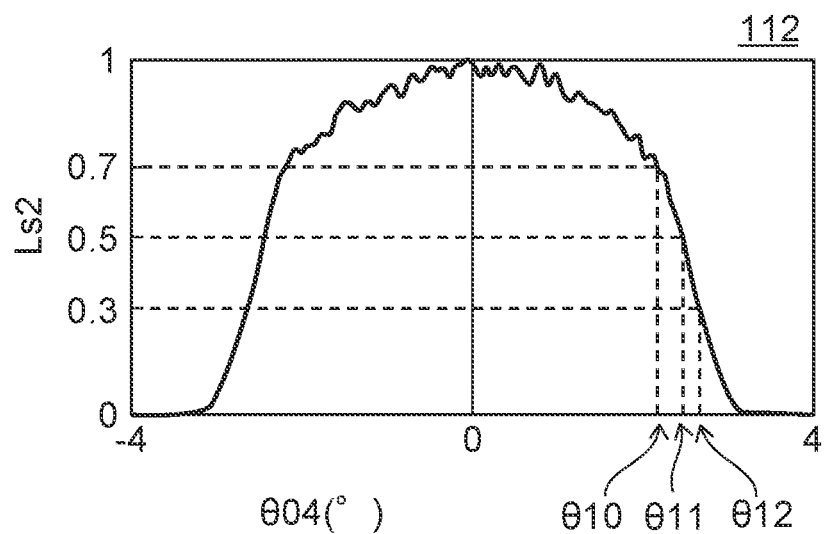
FIG. 19B is a graph of an example of a characteristic of the light source device according to the first embodiment.
Figure 20A:
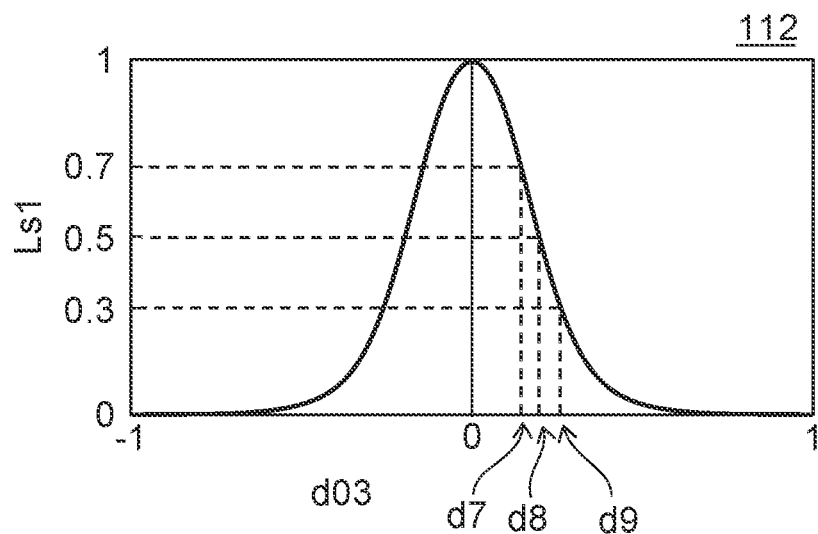
FIG. 20A is a graph of an example of a characteristic of the light source device according to the first embodiment.
Figure 20B:
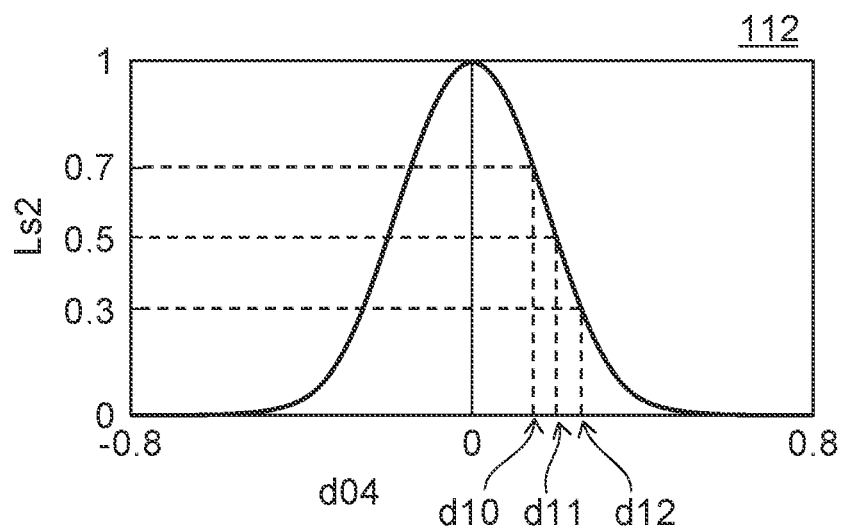
FIG. 20B is a graph of an example of a characteristic of the light source device according to the first embodiment.

These graphs exemplarily show examples of characteristics of the light source device 111 (see FIG. 1) according to one embodiment of the present invention. The light source device 111 is an example of the light source device according to one embodiment of the present invention. FIGS. 13AS, 13B, 14A, and 14B correspond to the characteristic along the first plane PL1 and, for example, to the characteristic along the fast axis Af of the first light L1. FIGS. 15A, 15B, 16A, and 16B correspond to the characteristic along the second plane PL2 and, for example, to the characteristic along the slow axis As of the first light L1. The horizontal axis in FIG. 13A indicates the angle θ01 (degrees). The horizontal axis in FIG. 13B indicates the angle θ02 (degrees). The horizontal axis in FIG. 14A indicates the distance d01 (arbitrary unit). The horizontal axis in FIG. 14B indicates the distance d02 (arbitrary unit). The horizontal axis in FIG. 15A indicates the angle θ03 (degrees). The horizontal axis in FIG. 15B indicates the angle θ04 (degrees). The horizontal axis in FIG. 16A indicates the distance d03 (arbitrary unit). The horizontal axis in FIG. 16B indicates the distance d04 (arbitrary unit). The vertical axis in these graphs indicates the intensity Ls1 of the first light L1 or the intensity Ls2 of the second light L2.

In the light source device 111, the first ratio α1 is 0.617 and the second ratio α2 is 0.042. The third ratio α3 is 0.576 and the fourth ratio α4 is 0.573. The fifth ratio α5 is 0.595 and the sixth ratio α6 is 0.057. The seventh ratio α7 is 0.610 and the eighth ratio α8 is 0.552.

FIGS. 17A, 17B, 18A, 18B, 19A, 19B, 20A, and 20B are each a graph of an example of a characteristic of the light source device according to the first embodiment.

These graphs show examples of characteristics of a light source device 112 according to one embodiment of the present invention (see FIG. 1). The light source device 112 is one example of the light source device according to one embodiment of the present invention. FIGS. 17A, 17B, 18A, and 18B correspond to the characteristic along the first plane PL1 and, for example, to the characteristic along the fast axis Af of the first light L1. FIGS. 19A, 19B, 20A, and 20B correspond to the characteristic along the second plane PL2 and, for example, to the characteristic along the slow axis As of the first light L1. The horizontal axis in FIG. 17A indicates the angle θ01 (degrees). The horizontal axis in FIG. 17B indicates the angle θ02 (degrees). The horizontal axis in FIG. 18A indicates the distance d01 (arbitrary unit). The horizontal axis in FIG. 18B indicates the distance d02 (arbitrary unit). The horizontal axis in FIG. 19A indicates the angle θ03 (degrees). The horizontal axis in FIG. 19B indicates the angle θ04 (degrees). The horizontal axis in FIG. 20A indicates the distance d03 (arbitrary unit). The horizontal axis in FIG. 20B indicates the distance d04 (arbitrary unit). The vertical axis in these graphs indicates the intensity Ls1 of the first light L1 or the intensity Ls2 of the second light L2.

In the light source device 112, the first ratio α1 is 0.617 and the second ratio α2 is 0.16. The third ratio α3 is 0.576 and the fourth ratio α4 is 0.573. The fifth ratio α5 is 0.595 and the sixth ratio α6 is 0.192. The seventh ratio α7 is 0.610 and the eighth ratio α8 is 0.552.

Also in the light source devices 111 and 112, the angular distribution of the intensity Ls2 of the second light L2 is "top-hat-like." For example, when the second light L2 with improved uniformity in angular distribution is condensed by the optical element 31 or the like, the incident region 31S shows the light intensity distribution of improved uniformity. For example, the quadrangular incident region 31S shows the light intensity distribution of improved uniformity. One embodiment provides a light source device that exhibits light intensity distribution of improved uniformity.

The light source device according to one embodiment includes, for example, the first light source 11 that emits the first light L1, and the first lens 21 that includes the first surface 21a and the second surface 21b. As has been described above, the first light L1 is incident on the first surface 21a, and the second light L2 is emitted from the second surface 21b. The intensity Ls1 of the first light L1 has the first value v1 on the first optical axis La1 of the first light L1. The intensity Ls1 of the first light L1 in the direction at the first angle θ1 from the first optical axis La1 is 0.7 times as great as the first value v1. The intensity Ls1 of the first light L1 in the direction at the second angle θ2 from the first optical axis La1 is 0.5 times as great as the first value v1. The intensity Ls1 of the first light L1 in the direction at the third angle θ3 from the first optical axis La1 is 0.3 times as great as the first value v1. The intensity Ls2 of the second light L2 has the second value v2 on the second optical axis La2 of the second light L2. The intensity Ls2 of the second light L2 in the direction at the fourth angle θ4 from the second optical axis La2 is 0.7 times as great as the second value v2. The intensity Ls2 of the second light L2 in the direction at the fifth angle θ5 from the second optical axis La2 is 0.5 times as great as the second value v2. The intensity Ls2 of the second light L2 in the direction at the sixth angle θ6 from the second optical axis La2 is 0.3 times as great as the second value v2. The direction at the first angle θ1, the direction at the second angle θ2, the direction at the fourth angle θ4, the direction at the fifth angle θ5, and the direction at the sixth angle θ6 extend in the first plane PL1 that includes the direction at the third angle θ3 and the first optical axis La1. In the first lens 21, the second ratio α2 is set to be smaller than the first ratio α1. The first ratio α1 refers to a ratio of the absolute value of the difference between the first angle θ1 and the third angle θ3 to the second angle θ2. The second ratio α2 refers to a ratio of the absolute value of the difference between the fourth angle θ4 and the sixth angle θ6 to the fifth angle θ5. The angular distribution width Ws (see FIG. 12) extending in the first plane PL1 of the second light L2 is greater than a value 1.5 times as great as arctan (y/fL). "fL" is the focal length of the first lens 21. "y" is a length of ½ of a length of the first light source 11 in the first plane PL1. The angular distribution width Ws corresponds to, for example, the angle θ02, at which the intensity Ls2 of the second light L2 is 0.135 times as great as the second value v2 of the intensity Ls2 of the second light L2 in the second optical axis La2.

For example, in the light source device according to one embodiment, the shape of the second surface 21b of the first lens 21 can be approximately expressed by the Mathematical Expression 1 described below.

Mathematical Expression 1

$$z = \frac{\frac{h^2}{r}}{1 + \sqrt{1 - \frac{(1+k)h^2}{r^2}}} + Ah^4 + Bh^6 + Ch^8 + Dh^{10} \cdots \quad (1)$$

In the first equation, "z" is a sag value, "k" is a conic coefficient, "r" is a radius of curvature, and "h" is a center distance. In the first equation, "A", "B", "C", and "D" are coefficients.

For example, in the light source device 111, the first surface 21a is a substantially flat surface. In this case, a shape of the second surface 21b in the first plane PL1 (for example, a shape along the fast axis Af) is expressed with the coefficients "r" of −2.237, "k" of −0.035, "A" of 8.4702× $10^{-3}$, "B" of 3.0393×$10^{-3}$, "C" of −8.9688×$10^{-4}$, and "D" of 3.499910$^{-4}$.

In the light source device 111, when the first surface 21a is a substantially flat surface, a shape in the second plane PL2 of the second surface 21b (for example, a shape extending along the slow axis As) is expressed with the coefficients "r" of −7.284, "k" of 26.305, "A" of −6.5943× $10^{-1}$, "B" of 1.6014, "C" of −1.2907, and "D" of 0.

In the first lens 21 having such a shape, the focal length fL is, for example, 4.76 mm. On the other hand, in the first light L1 emitted from the first light source 11 and incident on the first surface 21a of the first lens 21, the divergence angle in the direction of the fast axis Af is 51 degrees and the divergence angle in the direction of the slow axis As is 9.5 degrees. The divergence angle corresponds to an angle between the first optical axis La1 and the direction at the angle at which the intensity Ls1 of the first light L1 is 0.135 times as great as the first value v1 of the intensity Ls1 on the first optical axis La1. The divergence angle corresponds to, for example, the angular distribution width Ws.

In one embodiment, the angular distribution of the intensity Ls1 of the first light L1 is, for example, "Gaussian distribution-like" distribution. The Gaussian distribution is expressed by, for example, the second equation described below.

Mathematical Expression 2

$$I(x) = \left| E_0 \cdot \exp\left(-\left(\frac{x}{w}\right)^{2N}\right) \right|^2 \quad (2)$$

In the second equation, when the super-Gaussian coefficient N is 1, the distribution is a general Gaussian distribution. When the super-Gaussian coefficient N is increased, the distribution becomes "top-hat-like" distribution. In one embodiment, the super-Gaussian coefficient N of the angular distribution of the intensity Ls2 of the second light L2 is, for example, 2 or more. In one embodiment, the super-Gaussian coefficient N of the angular distribution of the intensity Ls2 of the second light L2 may be, for example, 4 or more.

For example, in the first lens 21, the curvature of at least a portion of the first surface 21a is smaller than the curvature of at least a portion of the second surface 21b. For example, the first surface 21a is a substantially flat surface, and the second surface 21b may be a convex surface.

Second Embodiment

Figure 21:
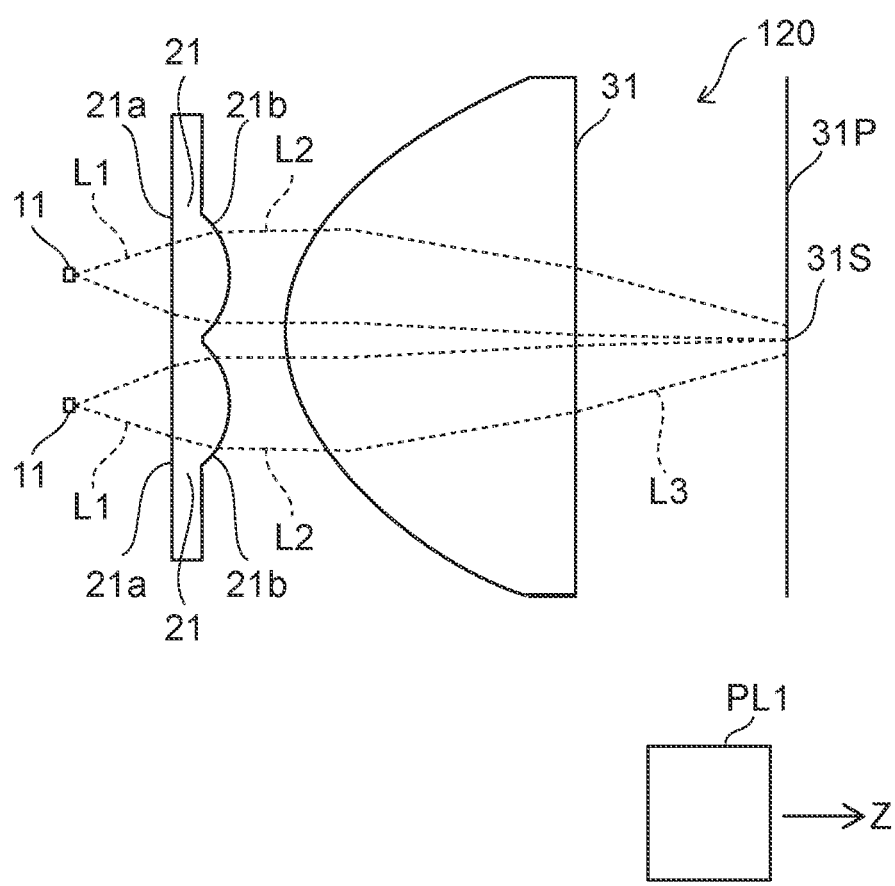
FIG. 21 is a schematic diagram of a light source device according to a second embodiment.

FIG. 21 is a schematic diagram of a light source device according to a second embodiment.

As illustrated in FIG. 21, a light source device 120 according to one embodiment includes a plurality of first light sources 11 and a plurality of first lenses 21.

The first light L1 emitted from a corresponding one of the plurality of first light sources 11 is incident on one of the plurality of first lenses 21. The first light L1 emitted from another one of the plurality of first light sources 11 is incident on another one of the plurality of first lenses 21. The direction from the corresponding one of the plurality of first light sources 11 to the another one of the plurality of first light sources 11 extends in, for example, the first plane PL1.

In this manner, the plurality of first light sources 11 and the plurality of first lenses 21 may be used in combination. The second light L2 is emitted from each of the plurality of first lenses 21. One of the plurality of second lights L2 is emitted from the second surface 21b of a corresponding one of the plurality of first lenses 21. A plurality of second lights L2 are incident on the optical element 31. The plurality of third lights L3 derived from the plurality of second lights L2 is emitted from the optical element 31. The plurality of third lights L3 is condensed to the condensing position 31P. At the condensing position 31P, for example, the incident regions 31S of the third lights L3 are formed. The incident regions 31S have, for example, a quadrangular shape.

For example, the plurality of first light sources 11 and the plurality of first lenses 21 may be arranged so as to correspond to the incident region 31S.

In one embodiment, the first light L1 emitted from a corresponding one of the plurality of first light sources 11 has a first divergence angle that is formed in the first plane PL1. The distance between the center of the corresponding one of the plurality of first light sources 11 and the center of another one of the plurality of first light sources 11 in the first plane PL1 is greater than a value twice as great as the product of the focal length fL of the corresponding one of the plurality of first lenses 21 and the tangent of the first divergence angle. This allows for reducing incidence of light emitted from one of the plurality of first light sources 11 on the first lens 21 that corresponds to another one of the plurality of first light sources 11 in the first plane PL1. A plurality of first lights L1 are incident on respective corresponding first lenses 21.

The direction from one of the plurality of first light sources 11 to another one of the plurality of first light sources 11 may extend in a plane that intersects the first plane PL1. The plane that intersects the first plane PL1 may be, for example, the second plane PL2. The first light L1 emitted from the corresponding one of the plurality of first light sources 11 has the first divergence angle formed in the plane (for example, the second plane) that intersects the first plane PL1. The distance between the center of the corresponding one of the plurality of first light sources 11 and the center of the another one of the plurality of first light sources 11 in the plane that intersects the first plane PL1 is greater than a value twice as great as the product of the focal length fL of the corresponding one of the plurality of first lenses 21 and the tangent of the first divergence angle. This allows for reducing incidence of light emitted from one of the plurality of first light sources 11 on the first lens 21 corresponding to another one of the plurality of first light sources 11, in the plane that intersects the first plane PL1. A plurality of beams of first light L1 are incident on respective corresponding first lenses 21.

Figure 22:
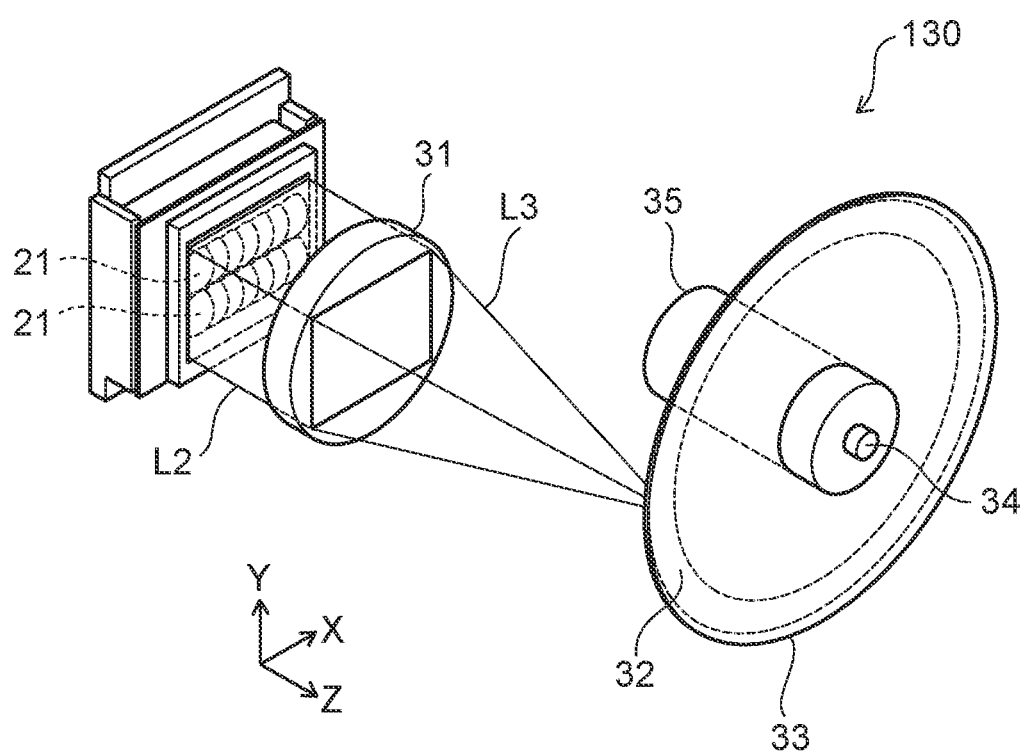
FIG. 22 is a schematic diagram of the light source device according to the second embodiment.

FIG. 22 is a schematic diagram of the light source device according to the second embodiment.

As illustrated in FIG. 22, a light source device 130 according to one embodiment includes a plurality of first lenses 21. The plurality of first lenses 21 are arranged, for example, in the X-axis direction and the Y-axis direction. A plurality of first light sources 11 (see FIG. 21) is provided so as to correspond to respective ones of the plurality of first lenses 21. In this example, the plurality of first light sources 11 are also arranged, for example, in the X-axis direction and the Y-axis direction.

The light source device 130 may further include the optical element 31 and the wavelength conversion member 32. The second light L2 is incident on the optical element 31. The third light L3 emitted from the optical element 31 is incident on the wavelength conversion member 32. Thus, the second light L2 condensed by the optical element 31 is incident on the wavelength conversion member 32 as the third light L3. The wavelength of the light emitted from the wavelength conversion member 32 is different from the wavelength of the second light L2 (or the third light L3). For example, the second light L2 is blue, and light emitted from the wavelength conversion member 32 is white light containing blue and yellow.

In this example, the wavelength conversion member 32 is disposed at a first member 33. The first member 33 is rotated by a driver 35 about a shaft 34.

The wavelength conversion member 32 is disposed at the first member 33 around the shaft 34. Rotation of the first member 33 causes changes in the position where the third light L3 is incident on the wavelength conversion member 32. This allows for preventing light of excessively high intensity from being continuously incident on one position. For example, deterioration of the wavelength conversion member 32 and the like can be reduced.

An example of the light source device according to one embodiment will be described below.

Figure 23A:
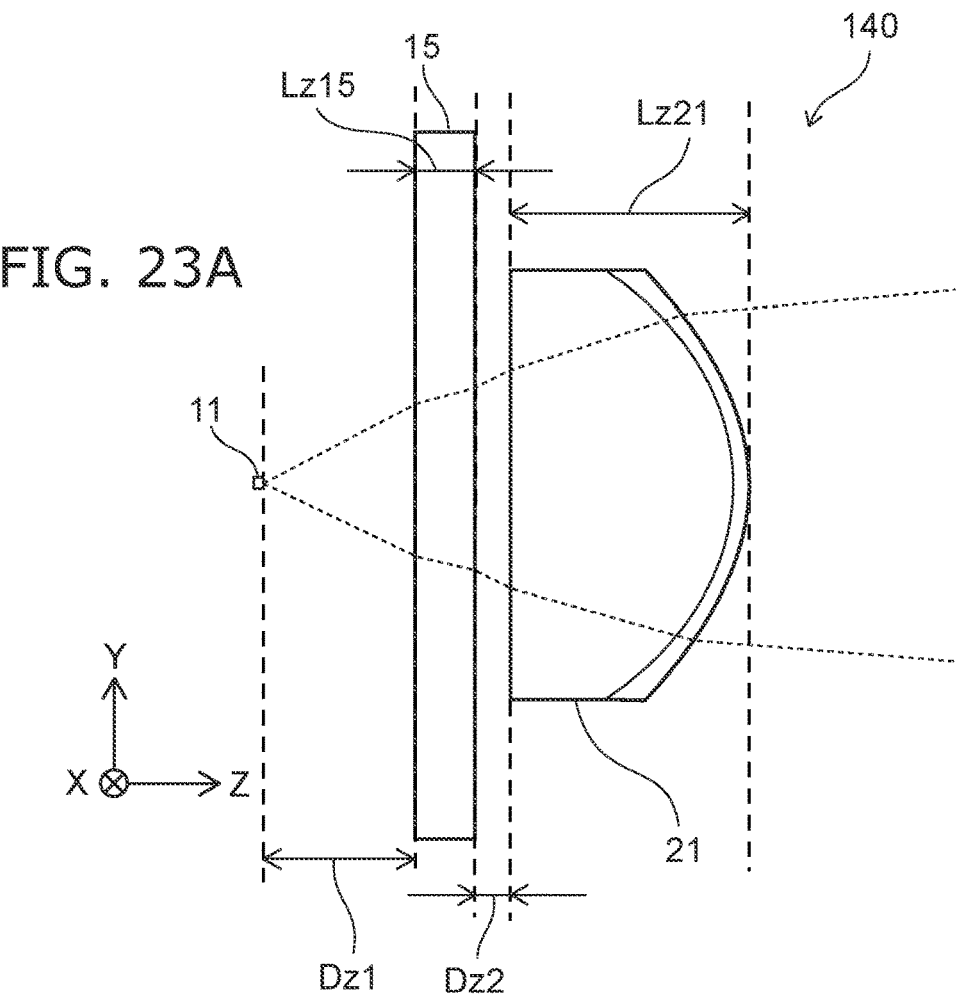
FIG. 23A is a schematic side view of the light source device according to one embodiment.
Figure 23B:
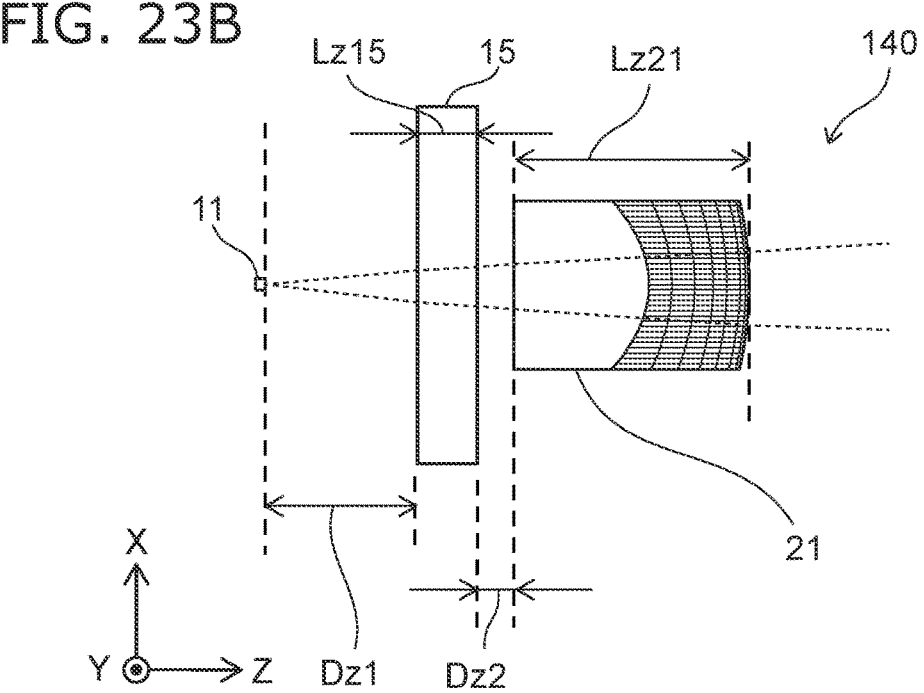
FIG. 23B is a schematic side view of the light source device according to one embodiment.

FIGS. 23A and 23B are schematic side views of the light source device according to one embodiment.

FIGS. 23A and 23B illustrate one of a plurality of first light sources 11 and a corresponding one of a plurality of first lenses 21. FIG. 23A is a side view in the X-axis direction. FIG. 23B is a side view in the Y-axis direction. As illustrated in FIGS. 23A and 23B, a light source device 140 according to one embodiment may include an optical component 15. The optical component 15 is disposed, at least, between a corresponding one of the plurality of first light sources 11 and a corresponding one of the plurality of first lenses 21. The optical component 15 may be disposed between a plurality of first light sources 11 and a plurality of first lenses 21. The optical component 15 is formed of, for example, sapphire glass. The optical component 15 has a length Lz15 (thickness) in the Z-axis direction of, for example, about 0.5 mm.

One of the plurality of first lenses 21 has a length Lz21 (thickness) in the Z-axis direction of, for example, about 2.0 mm. A distance Dz1 between one of the plurality of first light sources 11 and the optical component 15 in the Z-axis direction is, for example, about 1.3 mm. A distance Dz2 between the optical component 15 and one of the plurality of first lenses 21 in the Z-axis direction is about 0.3 mm.

In one example, the plurality of first light sources 11 (laser) have a peak wavelength of about 455 nm. In the Y-axis direction (the fast axis Af), the emitted light has a width of about 60 nm, the divergence angle of 22.75 degrees, and the super-Gaussian coefficient of 2. In the X-axis direction (the slow axis As), the emitted light has a width of about 45 the divergence angle of 4.75 degrees, and the super-Gaussian coefficient of 2. The divergence angle is an angle (full width) at which the intensity of emitted light is $1/e^2$ times as great as the peak value (where e is the Napier's constant).

Figure 24A:
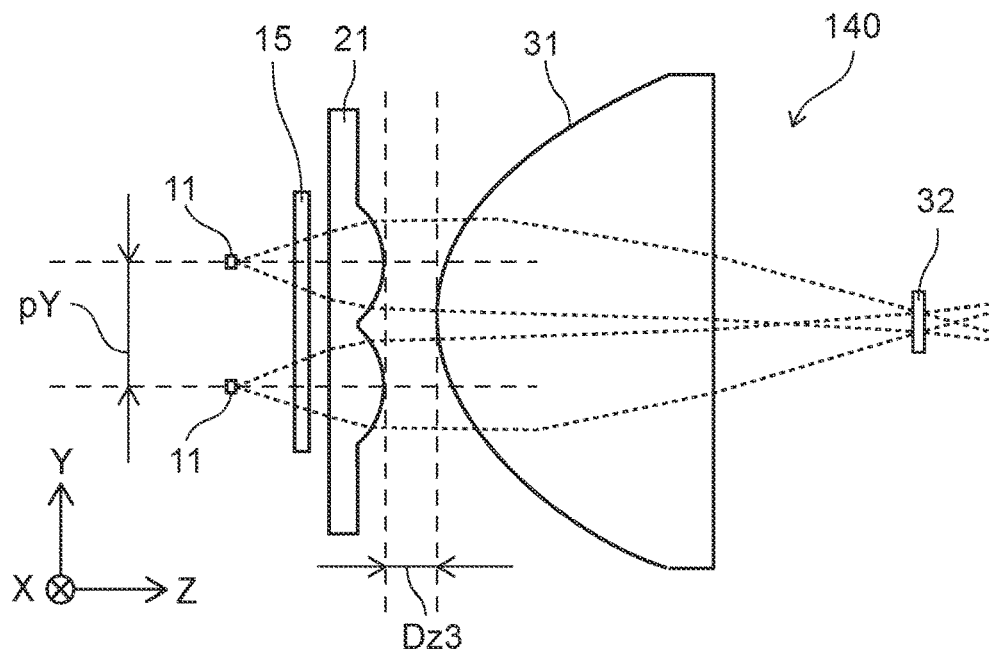
FIG. 24A is a schematic side view of the light source device according to one embodiment.
Figure 24B:
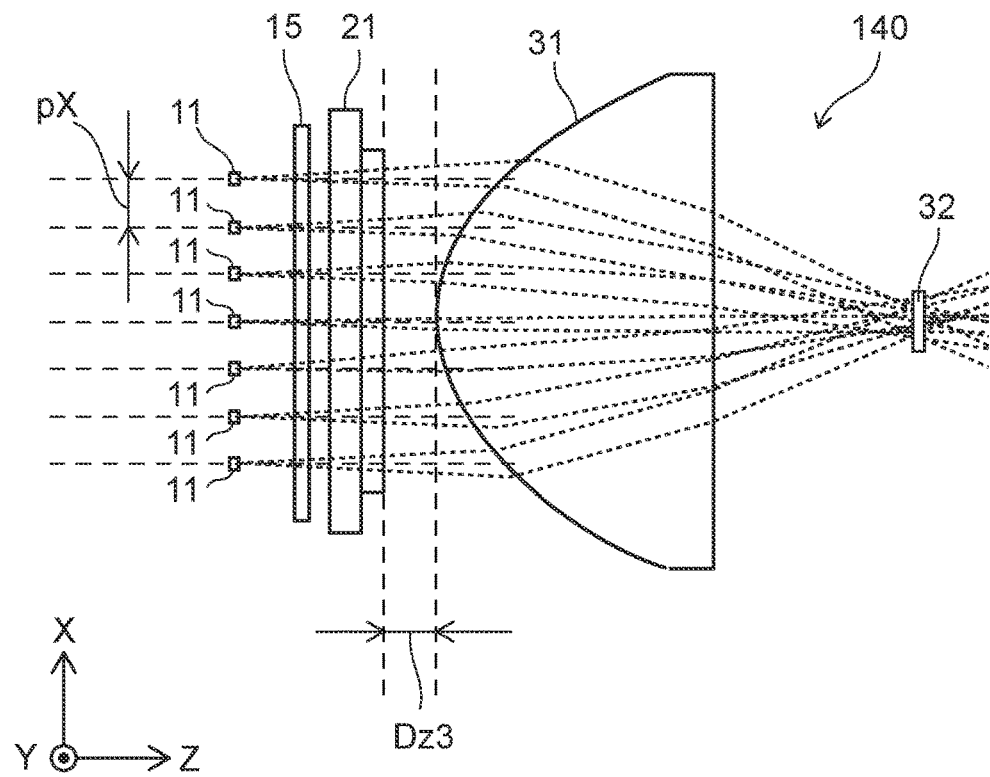
FIG. 24B is a schematic side view of the light source device according to one embodiment.

FIGS. 24A and 24B are schematic side views of an example of the light source device according to one embodiment.

FIG. 24A is a side view in the X-axis direction. FIG. 24B is a side view in the Y-axis direction. As illustrated in FIG. 24A, in the light source device 140, two first light sources 11 are arranged in the Y-axis direction. As illustrated in FIG. 24B, in the light source device 140, seven first light sources 11 are arranged in the X-axis direction. A pitch pY of the plurality of light sources 11 in the Y-axis direction (the fast axis Af) is about 6.0 mm. A pitch pX of the plurality of light sources 11 in the X-axis direction (the slow axis As) is about 2.4 mm.

The first lens 21 is provided so as to correspond to corresponding portions of the plurality of light sources 11. In the light source device 140, the distance Dz3 between the first lenses 21 and the optical element 31 along the Z-axis direction is about 2.5 mm. The distance Dz3 may be determined according to the aperture of the optical element 31, for example. In one example, the NA (numerical aperture) of the optical element 31 is about 0.65. For the optical element 31, for example, the product code #49-101 available from Edmund Optics, Inc., may be employed.

Figure 25:
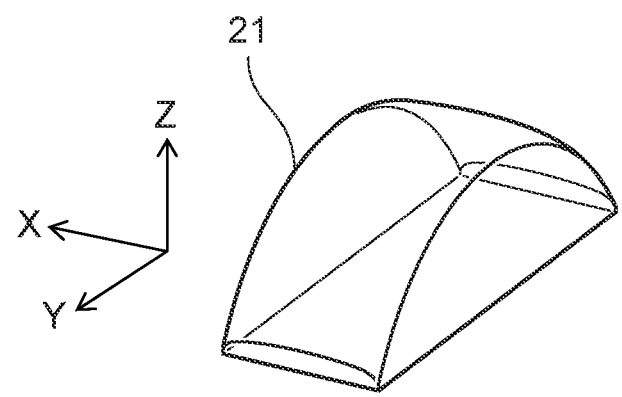
FIG. 25 is a schematic perspective view of part of the light source device according to one embodiment.

FIG. 25 is a schematic perspective view of a portion of the light source device according to one embodiment.

FIG. 25 illustrates one example of a shape of one of a plurality of first lenses 21. As illustrated in FIG. 25, one of the plurality of first lenses 21 has a length in the Y-axis direction greater than its length in the X-axis direction.

The shape of the second surface 21b of one of the plurality of first lenses 21 is substantially expressed by Mathematical Expression 3 described below.

Mathematical Expression 3

$$z = \frac{c_x x^2 + c_y y^2}{1 + \sqrt{1 - (1+kx)c_x^2 x^2 - (1+ky)c_y^2 y^2}} + \sum_{i=1}^{16} \alpha_i x^i + \sum_{i=1}^{16} \beta_i y^i + \sum_{i=1}^{N} A_i Z_i(\rho, \varphi) \quad (3)$$

In Mathematical Expression 3, "αi" and "βi" are higher-order aspheric coefficients in the direction x (the X-axis direction) and the direction y (the Y-axis direction).

In one example, in the Y-axis direction (the fast axis Af), "r" is −2.237, "k" is −0.035, the fourth-order aspheric coefficient is −8.4702×10$^{-3}$, the sixth-order aspheric coefficient is 3.0393×10$^{-3}$, the eighth-order aspheric coefficient is −8.9688×10$^{-4}$, and the tenth-order aspheric coefficient is 3.499910×10'.

In the X-axis direction (the slow axis As), "r" is −7.284, "k" is 26.305, the fourth-order aspheric coefficient is −6.594×10$^{-1}$, the sixth-order aspheric coefficient is 1.601, the eighth-order aspheric coefficient is −1.2907, and the tenth-order aspheric coefficient is 0.

Examples of the plurality of first lenses 21 include aspheric toroidal lenses and biconic Zernike lenses. Examples of a material of the plurality of first lenses 21 include K-PBK40 (for example, Ohara Corporation).

Figure 26:
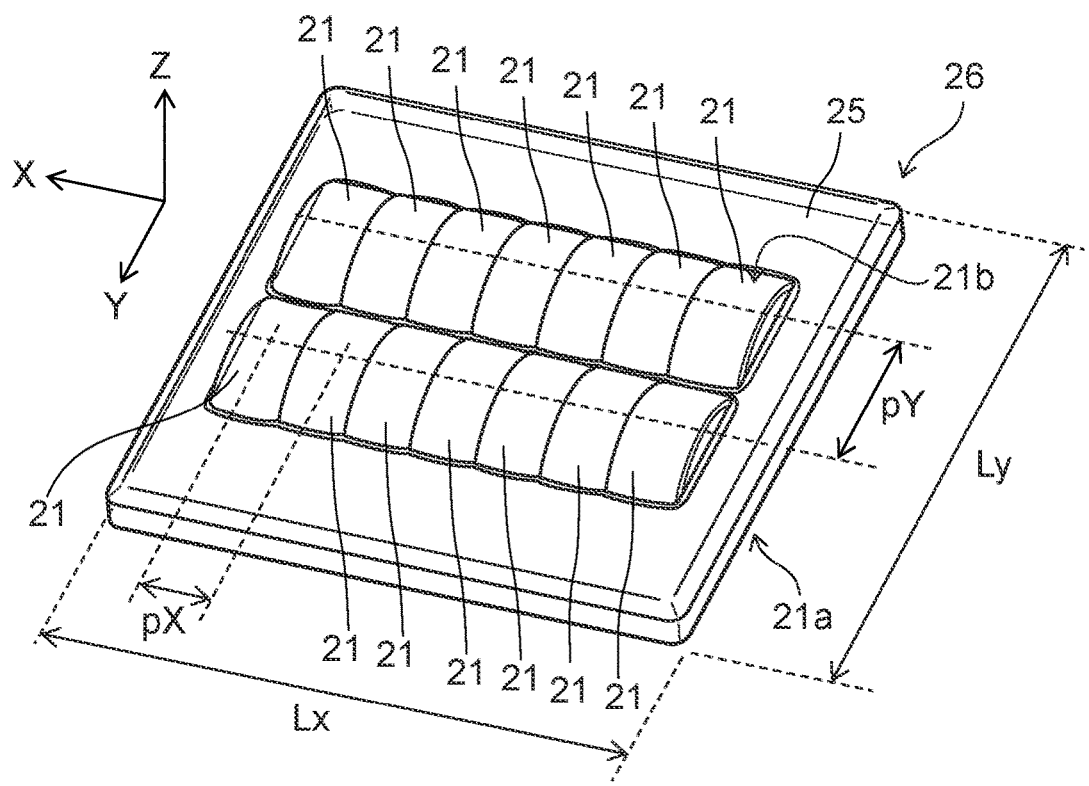
FIG. 26 is a schematic perspective view of part of the light source device according to one embodiment.

FIG. 26 is a schematic perspective view of part of the light source device according to one embodiment.

As illustrated in FIG. 26, a plurality of first lenses 21 may be disposed on a base part 25. The plurality of first lenses 21 and the base part 25 are included in the lens element 26. When the base part 25 is provided, the first surface 21a (the incident surface) corresponds to aback surface of the base part 25.

The second surface 21b (the emission surface) corresponds to a front surface of each first lens 21. The plurality of first lenses 21 and the base part 25 may be integrally formed. A material of the base part 25 may be the same as a material of the plurality of first lenses 21. The plurality of first lenses 21 are arranged in a matrix in the X-axis direction and the Y-axis direction.

The base part 25 has a length Lx in the X-axis direction of, for example, about 21.4 mm. The base part 25 has a length Ly in the Y-axis direction of, for example, about 21.4 mm.

Figure 27:
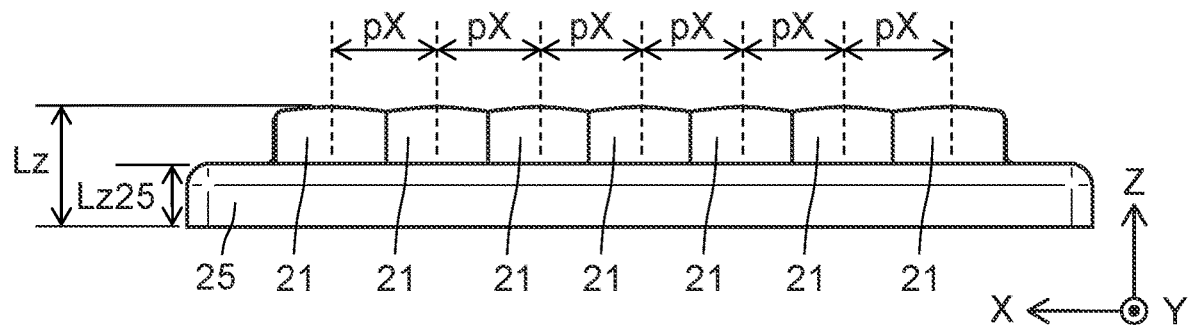
FIG. 27 is a schematic side view of part of the light source device according to one embodiment.

FIG. 27 is a schematic side view of a portion of the light source device according to one embodiment.

The base part 25 has a thickness (a length Lz25 in the Z-axis direction) of, for example, 1.5 mm. The length Lz which is the sum of the length in the Z-axis direction of the first lens 21 and the length Lz25 in the Z-axis direction of the base part 25 is, for example, 2.85 mm.

The values relating to the length (thickness) and the distance are examples and can be changed in one embodiment.

According to certain embodiments, a light source device that exhibits light intensity distribution of improved uniformity can be provided.

In the present specification, the terms "perpendicular" and "parallel" encompass not only an exactly perpendicular configuration and an exactly parallel configuration but also configurations slightly deviated from these configuration due to manufacturing variations, etc. That is, the terms "perpendicular" and "parallel" encompass substantially perpendicular and substantially parallel configurations, respectively.

Certain embodiments of the present invention has been described above with reference to the specific examples. The present invention is not limited to these specific examples. For example, the specific structures of the light sources, the lenses, the optical element, and the wavelength conversion member may be appropriately selected from known art by a person skilled in the art, and such specific configurations are included in the light source device are within the scope of the present invention so long as a person skilled in the art can similarly implement the structure the invention and similar effects can be obtained.

Furthermore, a combination of two or more elements of the specific embodiments is also within the scope of the present disclosure so long as it encompasses the spirit of the present disclosure.

Additionally, all light source devices that are appropriately modified by a person skilled in the art from the light source devices according to certain embodiments of the present disclosure are also within the scope of the present invention so long as it encompasses the spirit of the present disclosure.

Also, within the scope of the idea of the present invention, a person skilled in the art can achieve various variations and modifications, which are also construed to be within the scope of the present disclosure.

What is claimed is:

1. Alight source device comprising:
a first light source configured to emit first light; and
a first lens that includes a first surface on which the first light having a first optical axis is incident and a second surface from which second light having a second optical axis is emitted, wherein:
an intensity of the first light at the first surface in a direction of the first optical axis has a first value,
the intensity of the first light at the first surface in a direction at a first angle with respect to the first optical axis is 0.7 times as great as the first value,
the intensity of the first light at the first surface in a direction at a second angle with respect to the first optical axis is 0.5 times as great as the first value,
the intensity of the first light at the first surface in a direction at a third angle with respect to the first optical axis is 0.3 times as great as the first value,
an intensity of the second light at the second surface in a direction of the second optical axis has a second value,
the intensity of the second light at the second surface in a direction at a fourth angle with respect to the second optical axis is 0.7 times as great as the second value,
the intensity of the second light at the second surface in a direction at a fifth angle with respect to the second optical axis is 0.5 times as great as the second value,
the intensity of the second light at the second surface in a direction at a sixth angle with respect to the second optical axis is 0.3 times as great as the second value,
the direction at the first angle, the direction at the second angle, the direction at the fourth angle, the direction at the fifth angle, and the direction at the sixth angle extend in a first plane that includes the direction at the third angle and the first optical axis, an angle with respect to the first optical axis in the first plane, at which the intensity of the first light at the first surface is 0.135 times as great as the first value, is 3 degrees or more, and the first lens is configured such that:
  where a first ratio is a ratio of (i) an absolute value of a difference between the first angle and the third angle to (ii) the second angle, and
  where a second ratio is a ratio of (i) an absolute value of a difference between the fourth angle and the sixth angle to (ii) the fifth angle,
  the second ratio is smaller than the first ratio.

2. The light source device according to claim 1, wherein the intensity of the first light at the first surface at a first position on a first axis in the first plane is 0.7 times as great as the first value, the intensity of the first light at the first surface at a second position on the first axis is 0.5 times as great as the first value, the intensity of the first light at the first surface at a third position on the first axis is 0.3 times as great as the first value, the intensity of the second light at the second surface at a fourth position on a second axis in the first plane is 0.7 times as great as the second value, the intensity of the second light at the second surface at a fifth position on the second axis is 0.5 times as great as the second value, the intensity of the second light at the second surface at a sixth position on the second axis is 0.3 times as great as the second value, and the first lens is configured such that:
  where a third ratio is a ratio of (i) an absolute value of a difference between a first distance between the first optical axis and the first position along the first axis and a third distance between the first optical axis and the third position along the first axis to (ii) a second distance between the first optical axis and the second position along the first axis, and
  where a fourth ratio is a ratio of (i) an absolute value of a difference between a fourth distance between the second optical axis and the fourth position along the second axis and a sixth distance between the second optical axis and the sixth position along the second axis to (ii) a fifth distance between the second optical axis and the fifth position along the second axis
  an absolute value of a difference between the first ratio and the second ratio is greater than an absolute value of a difference between the third ratio and the fourth ratio.

3. The light source device according to claim 1, wherein the absolute value of the difference between the first ratio and the second ratio is greater than 0.3.

4. The light source device according to claim 1, wherein the second ratio is 0.297 or less.

5. The light source device according to claim 1, wherein an angle with respect to the first optical axis in the first plane, at which the intensity of the first light at the first surface is 0.135 times as great as the first value, is 15 degrees or more.

6. The light source device according to claim 1, wherein:
the first light is first laser light, and
the first plane extends along a fast axis of the first laser light.

7. The light source device according to claim 1, wherein:
the intensity of the first light at the first surface in a direction at a seventh angle with respect to the first optical axis is 0.7 times as great as the first value, the intensity of the first light at the first surface in a direction at an eighth angle with respect to the first optical axis is 0.5 times as great as the first value, the intensity of the first light at the first surface in a direction at a ninth angle with respect to the first optical axis is 0.3 times as great as the first value, the intensity of the second light at the second surface in a direction at a tenth angle with respect to the second optical axis is 0.7 times as great as the second value, the intensity of the second light at the second surface in a direction at an eleventh angle with respect to the second optical axis is 0.5 times as great as the second value, the intensity of the second light at the second surface in a direction at a twelfth angle with respect to the second optical axis is 0.3 times as great as the second value, the direction at the seventh angle, the direction at the eighth angle, the direction at the tenth angle, the direction at the eleventh angle, and the direction at the twelfth angle extend in a second plane that includes the direction at the ninth angle and the first optical axis and intersects the first plane, an angle from the first optical axis in the second plane, at which the intensity of the first light at the first surface is 0.135 times as great as the first value, is 3 degrees or more, and the first lens is configured such that:
  where the fifth ratio is a ratio of (i) an absolute value of a difference between the seventh angle and the ninth angle to (ii) the eighth angle, and
  where the sixth ratio is a ratio of (i) an absolute value of a difference between the tenth angle and the twelfth angle to (ii) the eleventh angle,
  the sixth ratio is smaller than the fifth ratio.

8. The light source device according to claim 7, wherein:
the intensity of the first light at the first surface at a seventh position on a third axis in the second plane is 0.7 times as great as the first value, the intensity of the first light at the first surface at an eighth position on the third axis is 0.5 times as great as the first value, the intensity of the first light at the first surface at a ninth position on the third axis is 0.3 times as great as the first value, the intensity of the second light at the second surface at a tenth position on a fourth axis extending in the second plane is 0.7 times as great as the second value, the intensity of the second light at the second surface at an eleventh position on the fourth axis is 0.5 times as great as the second value, the intensity of the second light at the second surface at twelfth position on the fourth axis is 0.3 times as great as the second value, the first lens is configured such that:
  where a seventh ratio is a ratio of (i) an absolute value of a difference between a seventh distance between the first optical axis and the seventh position along the third axis and a ninth distance between the first optical axis and the ninth position along the third axis to (ii) an eighth distance between the first optical axis and the eighth position along the third axis, and
  where an eighth ratio is a ratio of an absolute value of (i) a difference between a tenth distance between the second optical axis and the tenth position along the fourth axis and a twelfth distance between the second optical axis and the twelfth position along the fourth axis to (ii) an eleventh distance between the second optical axis and the eleventh position along the fourth axis, an absolute value of a difference between the fifth ratio and the sixth ratio is greater than an absolute value of a difference between the seventh ratio and the eighth ratio.

9. The light source device according to claim 7, wherein the absolute value of the difference between the fifth ratio and the sixth ratio is 0.3 or more.

10. The light source device according to claim 7, wherein an angle with respect to the first optical axis in the second plane, at which the intensity of the first light at the first surface is 0.135 times as great as the first value, is in a range of 3 degrees to 40 degrees.

11. The light source device according to claim 7, wherein the sixth ratio is 0.297 or less.

12. The light source device according to claim 7, wherein:
the first light is first laser light,
the first plane extends along a fast axis of the first laser light, and
the second plane extends along a slow axis of the first laser light.

13. The light source device according to claim 7, wherein:
where fL is a focal length of the first lens, and y is ½ times as great as a length of the first light source in the second plane, an angular distribution width of the second light in the second plane is greater than a value 1.5 times as great as arctan (y/fL).

14. The light source device according to claim 1, wherein a curvature of the first surface is smaller than a curvature of the second surface.

15. The light source device according to claim 1, comprising:
a plurality of the first light sources each configured to emit the first light; and
a plurality of the first lenses, wherein:
the first light emitted from a first of the plurality of first light sources is incident on a first of the plurality of first lenses,
the first light emitted from a second of the plurality of first light sources is incident on a second of the plurality of first lenses,
a direction from the first of the plurality of first light sources to the second of the plurality of first light sources extends in the first plane,
the first light emitted from the first of the plurality of first light sources has a first divergence angle formed in the first plane, and
a distance between a center of the first of the plurality of first light sources and a center of the second of the plurality of first light sources in the first plane is greater than a value twice as great as a product of a focal length of the first of the plurality of first lenses and a tangent of the first divergence angle.

16. The light source device according to claim 1, comprising:
a plurality of the first light sources each configured to emit the first light; and
a plurality of the first lenses, wherein:
the first light emitted from a first of the plurality of first light sources is incident on a first of the plurality of first lenses,
the first light emitted from a second of the plurality of first light sources is incident on a second of the plurality of first lenses,
a direction from the first of the plurality of first light sources to the second of the plurality of first light sources extends in a plane that intersects the first plane,
the first light emitted from the first of the plurality of first light sources has a first divergence angle formed in the plane that intersects the first plane, and
a distance between a center of the first of the plurality of first light sources and the second of the plurality of first light sources in the plane that intersects the first plane is greater than a value twice as great as a product of a focal length of the first of the plurality of first lenses and a tangent of the first divergence angle.

17. The light source device according to claim 1, further comprising an optical element, wherein:
the second light is incident on the optical element, and
the optical element is configured to condense the second light.

18. The light source device according to claim 17, further comprising a wavelength conversion member, wherein:
the second light condensed by the optical element is incident on the wavelength conversion member, and
a dominant wavelength of light emitted from the wavelength conversion member is different from a dominant wavelength of the second light.

19. The light source device according to claim 1, wherein a peak wavelength of the first light is in a range of 300 nm to 800 nm.

20. Alight source device comprising:
a first light source configured to emit a first light; and
a first lens that includes a first surface on which the first light is incident, and a second surface from which a second light is emitted, wherein:
an intensity of the first light at the first surface has a first value in a direction of a first optical axis of the first light,
the intensity of the first light at the first surface in a direction at a first angle with respect to the first optical axis is 0.7 times as great as the first value,
the intensity of the first light at the first surface in a direction at a second angle with respect to the first optical axis is 0.5 times as great as the first value,
the intensity of the first light at the first surface in a direction at a third angle with respect to the first optical axis is 0.3 times as great as the first value,
an intensity of the second light at the second surface has a second value in a direction of a second optical axis of the second light,
the intensity of the second light at the second surface in a direction at a fourth angle with respect to the second optical axis is 0.7 times as great as the second value,
the intensity of the second light at the second surface in a direction at a fifth angle with respect to the second optical axis is 0.5 times as great as the second value,
the intensity of the second light at the second surface in a direction at a sixth angle with respect to the second optical axis is 0.3 times as great as the second value,
the direction at the first angle, the direction at the second angle, the direction at the fourth angle, the direction at the fifth angle, and the direction at the sixth angle extend in a first plane that includes the direction at the third angle and the first optical axis, the first lens is configured such that:
- where a first ratio is a ratio of (i) an absolute value of a difference between the first angle and the third angle to (ii) the second angle, and
- where a second ratio is a ratio of (i) an absolute value of a difference between the fourth angle and the sixth angle to (ii) the fifth angle, the second ratio is smaller than the first ratio, and where fL is a focal length of the first lens, and y is ½ times as great as a length in the first plane of the first light source, an angular distribution width in the first plane of the second light is greater than a value 1.5 times as great as arctan (y/fL).

\* \* \* \* \*